United States Patent [19]

Kojima

[11] Patent Number: 5,605,400
[45] Date of Patent: Feb. 25, 1997

[54] MIXING ELEMENT AND METHOD OF PRODUCING THE SAME

[76] Inventor: Hisao Kojima, 3-53-21, Shioiri-cho, Tsurumi-ku, Yokohama-shi, Kanagawa-ken, Japan

[21] Appl. No.: 425,036

[22] Filed: Apr. 18, 1995

[30] Foreign Application Priority Data

Apr. 19, 1994 [JP] Japan ................................ 6-115817

[51] Int. Cl.$^6$ ........................................... B01F 5/06
[52] U.S. Cl. ................................... 366/339; 366/341
[58] Field of Search ............................... 366/336–340, 366/341

[56] References Cited

U.S. PATENT DOCUMENTS

| | | |
|---|---|---|
| 4,408,893 | 10/1983 | Rice ........................................ 366/339 |
| 4,466,741 | 8/1984 | Kojima . |
| 4,747,697 | 5/1988 | Kojima . |
| 4,878,925 | 11/1989 | Kojima . |
| 4,936,689 | 6/1990 | Federighi ................................ 366/338 |
| 5,104,233 | 4/1992 | Kojima . |

Primary Examiner—Robert W. Jenkins
Attorney, Agent, or Firm—Oblon, Spivak, McClelland, Maier & Neustadt, P.C.

[57] ABSTRACT

A mixing element comprises a cylindrical passage pipe through which a liquid flows, and a plurality of blade bodies disposed inside the passage pipe. The blade bodies forms inside the passage pipe a plurality of fluid passages extending spirally and in a longitudinal direction of the passage pipe. And, a gap between the blade bodies forms an opening for communicating the fluid passages to each other. These spiral blade bodies are produced independently to the passage pipe, after that, they are joined to an inner face of the passage pipe. Thus produced fluid fixer has an extremely high mixing-agitating effect.

3 Claims, 17 Drawing Sheets

MIXING ELEMENT AND METHOD OF PRODUCING THE SAME

BACKGROUND OF THE INVENTION

1. Field of the Invention

The present invention relates to a mixing element for use in a static type motionless fluid mixer having not a mechanically movable portion, for mixing one and more kinds of fluids (liquid, gas, and powder and particle substance), and relates to a method of producing the same.

2. Description of the Relevant Art

The static type fluid mixer of this kind is used as, for example, a treatment apparatus by a gas absorption reaction of a harmful material such as HCl, $Cl_2$, $NO_x$, $SO_x$ and the like in a waste gas, an organo-chloric compound removing apparatus by an aeration treatment of a waste water including an organo-chloric compound such as trichloroethane, methylene chloride, trihalomethane and the like in the waste water, otherwise a dust removing (dust collecting) apparatus of $SiO_2$ dust and the like exhausted from a semiconductor factory and an optical fiber producing factory. Also, the static type fluid mixer is used in many fields such as the chemical industry, the paper and pulp industry, the food industry, the fermentation industry, the civil engineering and construction industry, the plastic industry and the pollution prevention industry and the like.

This static type fluid mixer is constituted by disposing in a pipe a plurality of blades connected to each other, each of the blades being twisted spirally. During two and more kinds of fluids which are different in characteristic from each other flow in the fluid mixer, the fluid advances spirally through passages partitioned by the blades, and is divided at boarders of respective blades, and further is joined to the divided fluids passing through the other passages (for example, U.S. Pat. No. 4,408,893). And, the fluid is agitated and mixed by a repeat of the division and the joining.

The fluid includes a liquid, a gas or a powder and particle substance, and, as different characteristics of the fluid, there are a viscosity, a composition, a temperature, a color, and a particle size. This fluid mixer can mix the fluids which are different in phase, such as a mixing of a gas and a liquid.

Such a fluid mixer is used as means for a mixing, an agitating, a dispersion, an emulsification, an extraction, a heat exchanging, a reaction, a gas absorption and a dilution and the like, in the above mentioned fields.

Moreover, as a method of producing the fluid mixer, there is a method of inserting spiral blades of a right-handed twisting or a left-handed twisting in a pipe, and fixing adjacent blades to each other by welding and brazing and the like (Japanese Patent Publication (KOKOKU) 44 -8290). And, there is a technique of inserting spiral blades of a right-handed twisting or a left-handed twisting in a pipe, and engaging or fitting adjacent blades with each other to disposing them in a pipe (West Germany Laid Open No. 2262016). Further, there is a method of inserting spiral blades of a right-handed twisting or a left-handed twisting in a pipe while disposing supporting pieces between the adjacent blades, thereby fixing and connecting the blades by the supporting pieces (U.S. Pat. No. 3,953,002). Furthermore, there is a method of inserting baffle plates twisted on the right-handed side or on the left-handed side into a tubular housing, and engaging with each other concave grooves formed on protrusions of both ends of the baffle plate to thereby connect them (Japanese Patent Publication (KOKOKU) No. 1 -81928). Furthermore, there is proposed a fluid mixer in which baffle plates are formed by arranging narrow portions of band-like members at predetermined pitches, twisting wide portions of the band-like members spirally and in a clockwise direction or an anti-clockwise direction, and twisting the narrow portions by about 90°, and then the baffle plates are inserted into a pipe (U.S. Pat. No. 4,408,898).

However, the above mentioned respective fluid mixer all have drawback in which the producing thereof is not easy.

Particularly, there are drawbacks in which the connecting portions of the blades i-s weak in mechanical strength in a case where the blades are welded or bladed to each other (Japanese Patent Publication (KOKOKU) No. 44 -8290), and the welding portions are broken or snapped in a case where the twisting stress is added thereto.

Also, there is a drawback in which the connection portion of the baffle plates is weak in twisting stress and easy to be broken in a case where the baffle plates are spot-connected to each other at center portions thereof (U.S. Pat. No. 4,408,893).

And, this fluid mixer has a drawback in which the mixing effect in a laminar flow region of a high viscosity fluid.

Further, as described above, each of the conventional fluid mixers has the drawbacks in which the producing cost is expensive due to the difficulty of producing thereof and the mixing effect is low.

SUMMARY OF THE INVENTION

It is, therefore, an object of the present invention to provide a mixing element in which the strength of joint portions of respective blade bodies is large, and the fluid mixing effect is excellent and the producing cost is cheap, and to provide a method of producing the mixing element in high efficiency.

A mixing element according to the present invention comprises a cylindrical passage pipe through which a liquid flows, and spiral blade bodies disposed inside the passage pipe so as to form an opening portion in central portion of the passage pipe. The spiral blade forms inside the passage pipe a plurality of fluid passages. It is characterized in that a plurality of the fluid passages are communicated to each other through said opening portions.

A method of producing a mixing element according to the present invention is characterized in that the method comprises a step of joining a plurality of spiral blade bodies to an inside of a cylindrical passage pipe, the blade bodies each being produced independently to the passage pipe.

Further, a method of producing a mixing element according to the present invention comprises steps of joining a plurality of spiral blade bodies to an inside of a cylindrical passage pipe to form a plurality of fluid passages. Each of the spiral blade bodies is produced independently to the passage pipe, and joins to the passage pipe.

In the conventional mixing element, a cylindrical passage pipe and spiral blade bodies are unitedly formed. On the contrary, in the mixing element according to the present invention, a cylindrical passage pipe and spiral blade bodies are independently formed, respectively. Accordingly, the number of the blade bodies which improve the mixing efficiency can be increased easily. Also, the producing of the fluid mixer having a large diameter becomes easy, and the producing cost becomes cheap.

On the other hand, in the method of producing the mixing element according to the present invention, a cylindrical passage pipe and spiral blade bodies are independently formed, respectively. Since the spiral blade bodies are joined to an inside of the cylindrical passage pipe by means of a welding, an adhering, a depositing, and a locking and the like, the mixing element are produced easily.

And, in the method of producing the mixing element in which a number of spiral blade bodies contributing to an improvement of the mixing efficiency are joined to an inside of a cylindrical passage pipe, the cylindrical passage pipe is divided into a plural over whole longitudinal length, a plurality of blade bodies are joined to an inside of the divided passage pipe, after that, and the divided faces of the passage pipes are joined to each other, thereby the mixing element having a high mixing efficiency is produced easily.

The static type fluid mixer is accomplished by arranging thus produced plural mixing elements are disposed in the pipe, or by joining the mixing elements with each other. According to the present invention, the fluid mixer having an extremely high mixing efficiency can be produced easily and at a low cost. And, the fluid mixer having a large diameter can be produced at a low cost.

According to the present invention, the running cost of the apparatus is low, and the mixer having a high efficiency can be produced easily, and the price of the apparatus is cheap, since there becomes useless a driving power means for supplying one and more kinds of fluids of a liquid, a gas, a powder and particle substance and the like into the static fluid mixer including the mixing element, to mix and agitate the fluids. Also, since the power source becomes useless, the large scale apparatus becomes useless, and the installing area of the apparatus is enough to be narrow. Further, since the mixing and agitating efficiency and the absorbing efficiency is high, the mixing time and the treating time can be shortened. Furthermore, since the trouble such as the blinding due to the dust, and the like is eliminated, a long time continuous running of the apparatus can be realized.

Also, the blade bodies are produced individually, the mixer having a large diameter can be produced extremely easily and at a low cost. Further, this mixer can be used widely as means for a mixing, and agitating, a dispersion, an emulsification, an extraction, a heat exchanging, a reaction, a gas absorption, a dust collecting, a distillation, a rectification, an adsorption, a biochemical reacter and the like.

DETAILED DESCRIPTION OF THE PREFERRED EMBODIMENTS

Embodiments of the present invention will be described hereinafter in detail with reference to the accompanied drawings.

Figure 1:
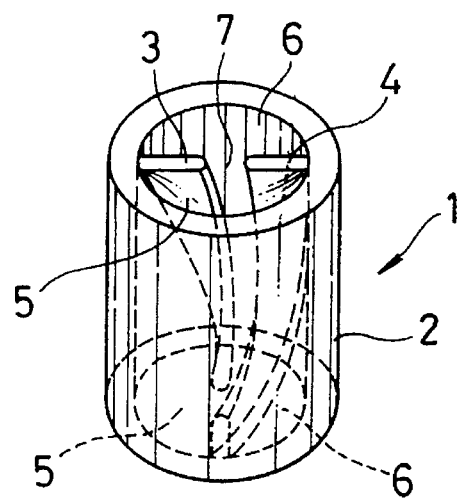
FIG. 1 is a perspective view of a 90° right-handed rotation type mixing element according to an embodiment of the present invention.
Figure 2:
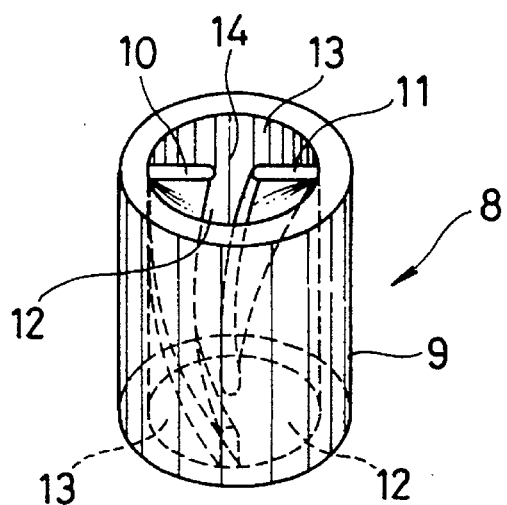
FIG. 2 is a perspective view of a 90° left-handed rotation type mixing element according to the same.
Figure 3:
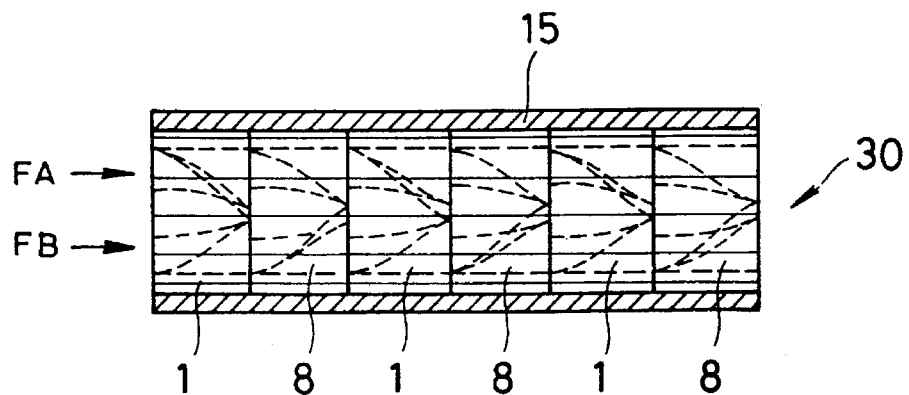
FIG. 3 is a side view of a static type fluid mixer according to an embodiment of the present invention.

FIGS. 1 and 2 are perspective views of a 90° right-handed rotation type mixing element. FIG. 3 is a side view of a static type fluid mixer to which the mixing element is applied. The mixing element 1 and 8 has cylindrical passage pipe 2 and 9, and spiral blade bodies 3, 4 and 10, 11 disposed in the passage pipe 2 and 9, respectively. The blade bodies 3, 4 and 10, 11 are twisted by 90° in a clockwise direction (a right-handed rotation) and an anti-clockwise direction (a left-handed rotation), respectively, and then form fluid passages 5, 5 and fluid passages 12, 13, respectively. The fluid passages 5, 6 and the fluid passages 12, 13 are communicated to each other over the whole length of the passage pipe 2 and 9 through an opening portion 7 and 14. A static type fluid mixer 30 is assembled by fitting the mixing elements 1 and 8 alternately into a cylindrical casing 15, and arranging the mixing elements 1 and 8 in such a manner that end edges of the blade bodies 3, 4 and end edges of the blade bodies 10, 11, both of which are to be connected, are perpendicular to each other.

Figure 4:
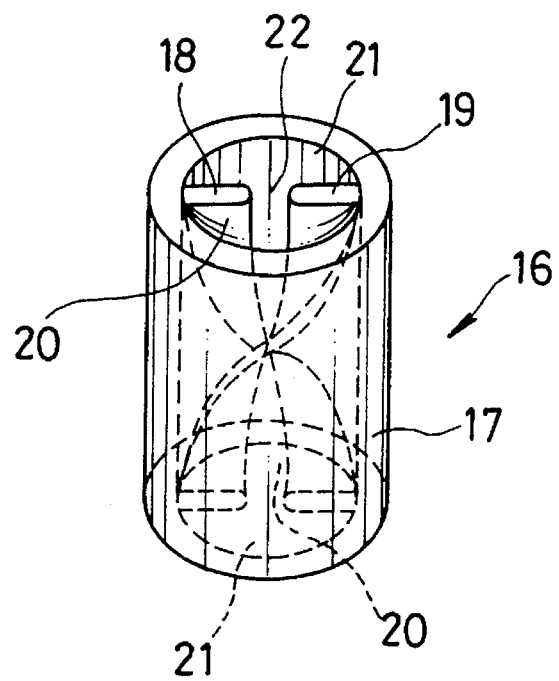
FIG. 4 is a perspective view of a 180° right-handed rotation type mixing element according to an embodiment of the present invention.
Figure 5:
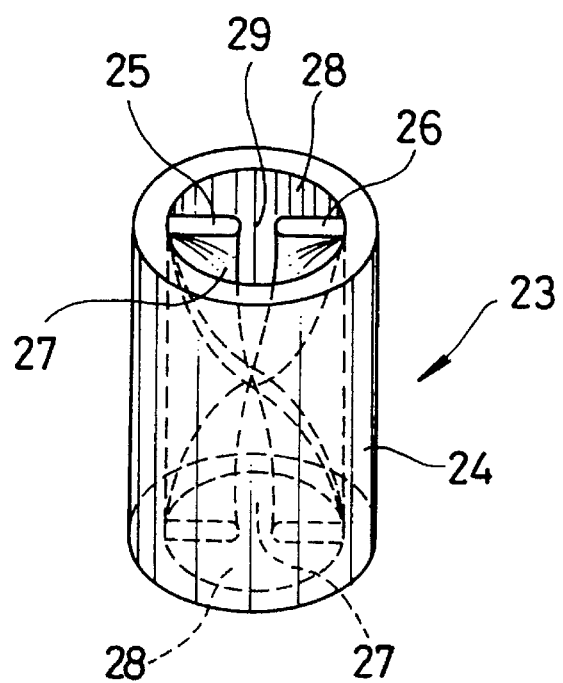
FIG. 5 is a perspective view of a 180° left-handed rotation type mixing element according to the same.
Figure 6:
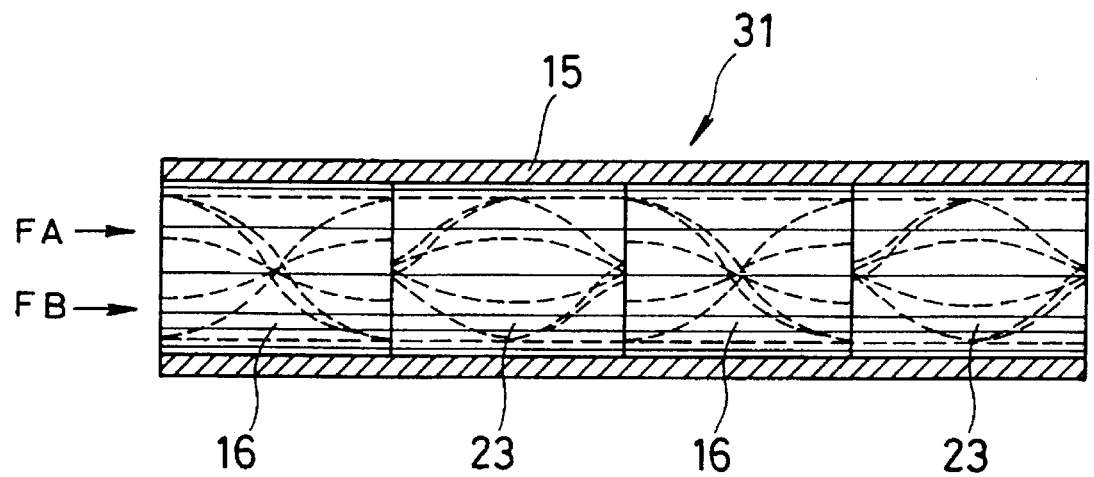
FIG. 6 is a side view of a static type fluid mixer according to the same.

FIGS. 4 and 5 are perspective views of 180° rotation type mixing elements 16 and 23, respectively. Fluid passages 20, 21 and 27, 28 are formed an inside portion of the passage pipe 17 and 24 by spiral blade bodies 18, 19 of 180° right-handed rotation and spiral blade bodies 25, 26 of 180° left-handed rotation, respectively. The fluid passages 20, 21 and 27, 28 are communicated to each other over the whole length of the passage pipe 17 and 24 through an opening portion 22 and 29, respectively. And, as shown in FIG. 6, a static type mixing element 31 is assembled by fitting the mixing elements 16 and 23 alternately into a cylindrical casing 15, and arranging the mixing elements 16 and 23 in such a manner that end edges of the blade bodies 18, 19 and end edges of the blade bodies 25, 26, both of which are to be connected, are perpendicular to each other.

Moreover, the opening portion 7, 14, 22, 29 may be straight or curved with respect to a longitudinal direction of the mixing element 1, 8, 16, 23. Further, the opening portion may be tapered in such a manner that a sectional area thereof is changed with respect to the longitudinal direction. And, a rotation angle (a twist angle) of the spiral blade bodies 3, 4, 10, 11, 18, 19, 25, 26 can be set at not only 90°, 180°, but also 270°, 360°, etc.

Further, a diametrical width and an axial length and the like of the blade body 3, 4, 10, 11, 18, 19, 25, 26 can be set optionally according to the object of use. Furthermore, the number of the blade bodies can be set optionally. And further, if the blade body is made of a perforated body or a porous body, a mixing effect is improved. And, the mixing element 34 may be formed by providing a space portion 38 at an upper portion, a lower portion (refer to FIG. 7), or both of them of an inside of the mixing element.

Moreover, the static type fluid mixer 30, 31 is formed by fitting the mixing elements alternately into the casing 15, however, it may be formed by joining the end edges of the mixing elements to each other.

During two kinds of fluids FA, FB flow through the fluid passages of the static type fluid mixer 30, 31 constructed as mentioned above, one portion of the fluid is rotated spirally by 90° or 180°, one portion of the rotated fluid is sheared at the opening portion, and the one portion of the fluid is joined with the fluid flowing through the other passage, and then after the division, they are rotated spirally by 90° or 180° reversely. During such a rotation, a shearing, a joining, a division, and a shift are repeated, the fluids are mixed.

Next, an embodiment to which the mixing element according to the present invention is applied will be described.

Figure 8:
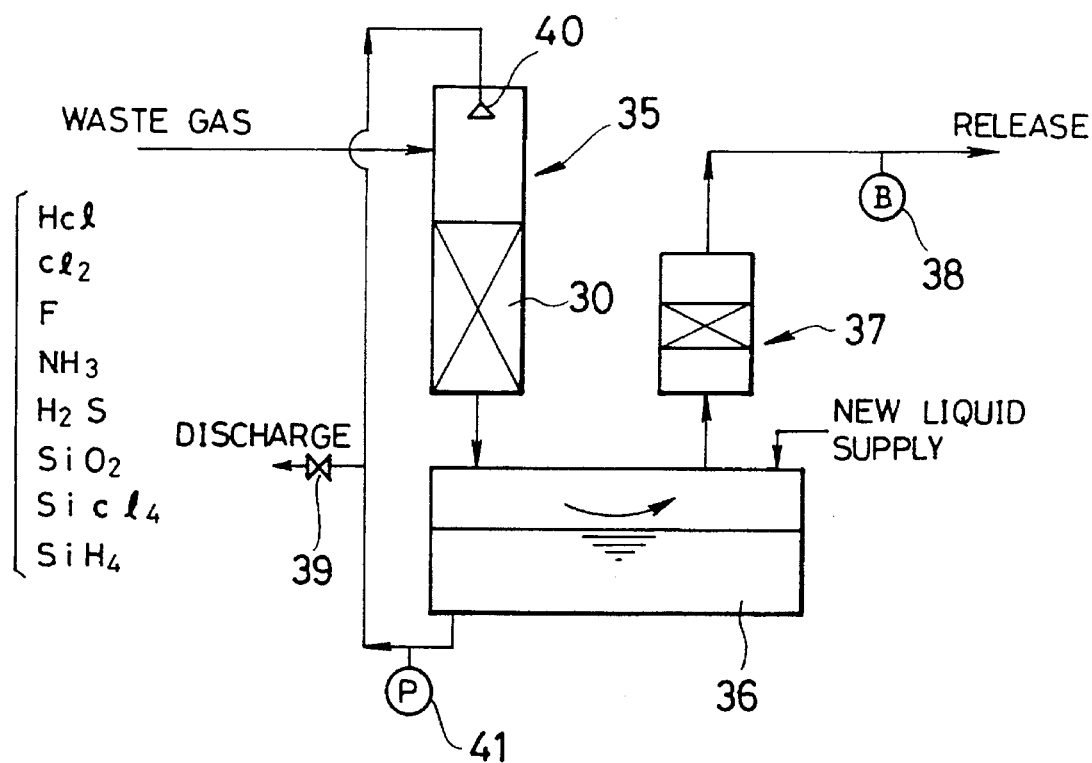
FIG. 8 is a block diagram showing an embodiment of the mixing element according to the present invention applied to a waste gas treatment apparatus.

FIG. 8 is a block diagram showing an embodiment of the mixing element according to the present invention applied to a treatment apparatus of a waste gas including a harmful gas of HCl, $Cl_2$, F, $NH_3$, $H_2S$ and the like, and a dust of $SiO_2$, ZnO and the like. The waste gas is supplied into the waste gas treatment apparatus 35 to which the static type fluid mixer 30 including the mixing element according to the embodiment of the present invention is applied, and then a substance of HCl, $Cl_2$ and the like in the waste gas is transferred from a gas phase to a liquid phase due to a mixing-catalysis between the gas and the liquid. The waste gas treatment apparatus 35 is connected with a tank 36 disposed therebelow, and the tank 36 is connected to a gas-liquid separating apparatus 37 such as a demister, a cyclone or a packed tower and the like. The gas and the liquid are separated at the gas-liquid separating apparatus, and the liquid is returned to the tank 36. A discharged gas from the gas-liquid separating apparatus 37 is released to the atmosphere through an exhauster 38. A water solution in the tank 36 is discharged to a waste water treatment process and the like by opening a valve 39 suitably, and a new liquid is supplied into the tank 36 suitably. The treatment apparatus 35 is provided with a spray nozzle 40 at a head portion thereof, and the nozzle 40 is supplied with the liquid in the tank 36 through a pump 41. Accordingly, the liquid is injected into the treatment apparatus 35 through the nozzle 40, and is collected in the tank 36, and then is supplied to the nozzle 40 through the pump 41, thereby the liquid is circulated to be used. As for this liquid, a water or an acid or alkaline water and the like is selectively used according to the substance in the waste gas.

Next, a construction of the treatment apparatus 35 will be explained. The treatment apparatus 35 is, as shown in FIGS. 1 and 2, provided with the static type fluid mixer 30 including the mixing element 1, 8 constituted by arranging a plurality of the spiral blade bodies of a right-handed twist and a left-handed twist at a predetermined position of the mixing element. In thus constructed waste gas treatment apparatus 35, the waste gas including HCl, $Cl_2$, $SiO_2$ and the like is supplied into the treatment apparatus 35 from an upper portion of the treatment apparatus 35. And, the water solution pumped from the tank 36 by the pump 41 is injected into the treatment apparatus 35 through the spray nozzle 40 disposed on the head portion of the treatment apparatus 35. The waste gas and the water solution are rotated spirally in the right-handed direction and in the left-handed direction during they flow in parallel-flow in the treatment apparatus 35. The waste gas and the water solution are subjected to a mixing-catalysis in gas and liquid in high efficiency while such a division, a joining, a shift and a shearing function are repeated. Thereby, the substances of HCl, Cl₂ and the like in the waste gas is dissolved and absorbed in the water solution due to the chemical reaction in association with the liquid. And, micro particles of SiO₂ and the like are caught and collected in the water solution. The absorbed and caught substances are collected together with the water solution in the tank 36 disposed below. The waste gas is fed to the gas-liquid separating apparatus 37, and a spray of a small diameter existing in a flow of the gas is separated into the gas and the liquid by the gas-liquid separating apparatus 37, and then the liquid is returned to the tank 36. Moreover, a spray nozzle (not shown) is disposed on a head portion or a lower portion of the gas-liquid separating apparatus 37 and the water solution is injected into the apparatus 37 through the nozzle, so that a collecting efficiency of the contained substances is increased further more, and the maintenance service becomes easy. The water solution in the tank 36 is circulated to be used by the pump 41. If the water solution in the tank 36 includes particles of SiO₂ and hydrochloric acid and the like to become high in concentration thereof, the water solution in the tank 36 is discharged to the waste water treatment process and the like by opening the valve 39 suitably, and also a new liquid is supplied to the tank 36 suitably. A clean waste gas which is removed with substances of HCl, SiO₂ and the like is released to the atmosphere through the exhauster 38.

Moreover, a plurality of spray nozzles may be disposed in the treatment apparatus 35 in the longitudinal direction. In this case, a space portion may be disposed between the adjacent mixing elements, and one or more spray nozzles may be disposed in the space portion. And, the mixing element 34 having a space portion 33 may be used, and the spray nozzles may be disposed in the space portion 33. These spray nozzles prevents the dust and the reaction product from adhering to an inside of the mixing nozzle and ensures a long and continuous operation, and then decreases a pressure loss inside the apparatus 35. Further, these spray nozzles have effects that a gas-liquid catalysis is raised to improve the removing efficiency and the gas absorbing efficiency, furthermore the new liquid is supplied also.

Incidentally, operating conditions of a ratio between a treated amount of the gas and a circulated amount of the liquid, and a time of a mixing and contacting, etc. are selected suitably according to the kind, concentration, physical properties, etc. of the treatment gas.

Figure 9:
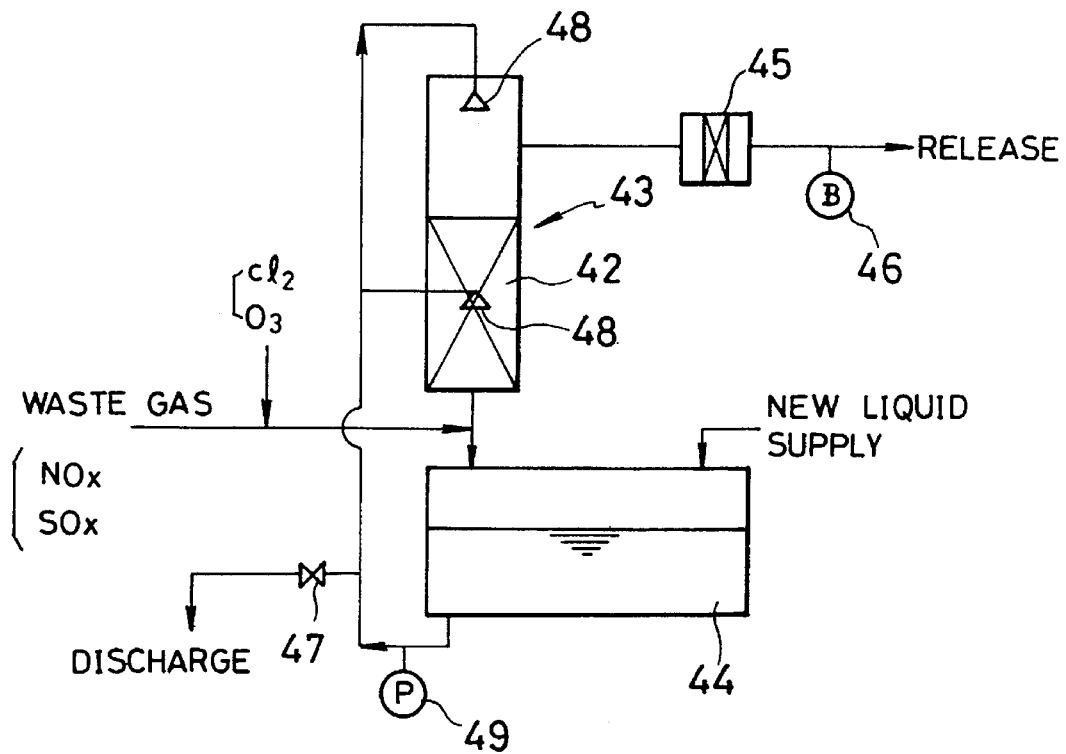
FIG. 9 is a block diagram showing an embodiment of the mixing element according to the present invention applied to a waste gas treatment apparatus.

Next, FIG. 9 is a block diagram showing an embodiment of the mixing element according to the present invention applied to a wet type treatment apparatus of a waste gas including a harmful gas such as $NO_x$, $SO_x$ and the like discharged from a burning furnace, an incinerator and a dissolving apparatus and the like. The waste gas is supplied into the waste gas treatment apparatus 43 from a lower portion thereof, which apparatus 43 is provided with a static type liquid mixer 42 formed by the mixing element according to the embodiment of the present invention, and $NO_x$, $SO_x$ and the like in the waste gas is subjected to a gas absorption or gas dilution reaction due to a mixing-catalysis between the gas and the liquid, so that the harmful substance is absorbed in the water solution. The waste gas treatment apparatus 43 is connected with a tank 44 disposed therebelow. A purified discharge gas from the waste gas treatment apparatus 43 is released to the atmosphere through a gas-liquid separating apparatus 45 and an exhauster 46. The water solution is discharged to the waste water treatment process and the like by opening a valve 47 suitably, and a new liquid is supplied to the tank 44 suitably. The treatment apparatus 43 is provided with spray nozzles 48 at a head portion and a lower portion thereof, and the nozzles 48 are supplied with the water solution in the tank 44 through a pump 49. Accordingly, this liquid is injected into the treatment apparatus 43 through the nozzles 48, next is collected in the tank 44, and then is supplied to the nozzles 48 through the pump 49, thereby the liquid is circulated to be used. As for this liquid, a water solution or an alkaline water solution such as NaOH, Ca(OH)₂, CaCO₃, Mg(OH)₂ and the like is suitably and selectively used according to the substance in the waste gas. Also, an oxidizer such as Cl₂, O₃ and the like may be added into the treatment apparatus 43 to raise a treatment ability.

Next, a construction of the treatment apparatus 43 will be described.

The treatment apparatus 43 is, as shown in FIGS. 1 and 2, provided with the static type fluid mixer 42 including the mixing element 1, 8 constituted by arranging a plurality of the spiral blade bodies of a right-handed twist and a left-handed twist at a predetermined position of the mixing element. In thus constructed waste gas treatment apparatus 43, the waste gas including $NO_x$, $SO_x$ and the like is supplied into the treatment apparatus 43 from a lower portion of the treatment apparatus 43. And, the water solution pumped from the tank 44 by the pump 49 is injected into the treatment apparatus 43 through the spray nozzles 48 disposed on the head portion and the lower portion of the treatment apparatus 43. The waste gas and the water solution are rotated spirally in the right-handed direction and in the left-handed direction during they flow in counter-flow in the treatment apparatus 43. The waste gas and the water solution are subjected to a mixing-catalysis in gas and liquid in high efficiency while such a division, a joining, a shift and a shearing function are repeated. Thereby, the substances of $NO_x$, $SO_x$ and the like in the waste gas is dissolved and absorbed in the water solution due to the chemical reaction in association with the liquid. The absorbed and caught substances are collected in the tank 44 disposed below together with the water solution. The waste gas is fed to the gas-liquid separating apparatus 45, and a spray of a small diameter existing in a flow of the gas is separated into the gas and the liquid by the gas-liquid separating apparatus, and then the liquid is returned to the tank 45 (not shown). A purified waste gas removed with $NO_x$, $SO_x$ and the like is released to the atmosphere through an exhauster 46. Incidentally, the direction in which the waste gas and the water solution flow in the treatment apparatus is of a counter-flow, however, the water solution and the waste gas may be flown in parallel-flow in the same direction.

Figure 10:
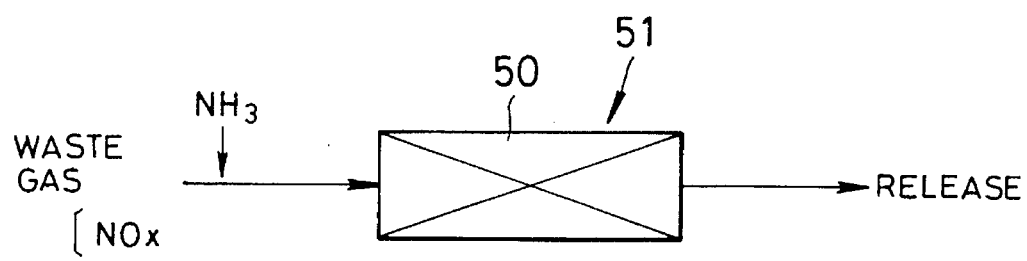
FIG. 10 is a block diagram showing an embodiment of the mixing element according to the present invention applied to a gas reaction apparatus of a waste gas.

Next, FIG. 10 is a block diagram showing an embodiment of the mixing element according to the present invention applied to a gas reaction apparatus of a waste gas including $NO_x$ gas discharged from a burning furnace, an incinerator and the like. The waste gas is supplied to a gas reaction apparatus 51 together with the NH₃ gas as a reducing agent, which apparatus 51 is provided with a static type fluid mixer 50 including the mixing element according to the embodiment of the present invention. $NO_x$ in the waste gas is reacted chemically with NH₃ in the following to be reduced and cracked into nitrogen and a water, and then is released to the atmosphere as a harmless gas.

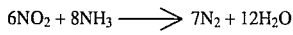

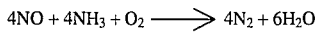

This chemical reaction is accelerated under the existence of a catalyzer having a catalytic action.

Next, a construction of the gas reaction apparatus 51 will be explained. The gas reaction apparatus 51 is, as shown in FIGS. 1 and 2, provided with the static type fluid mixer 50 including the mixing element 1, 8 constituted by arranging a plurality of the spiral blade bodies of a right-handed twist and a left-handed twist at a predetermined position of the mixing element. This gas reaction apparatus 51 is supplied with the waste gas and the $NH_3$ gas. The waste gas and the $NH_3$ gas are rotated spirally in the right-handed direction and the left-handed direction during they flow in parallel-flow in the gas reaction apparatus 51. The waste gas and the $NH_3$ gas are subjected to a uniform mixing and contacting each other without producing a biased stream and in high efficiency while such a division, a joining, a shift and a shearing function are repeated. $NO_x$ in the waste gas is reduced and cracked in nitrogen and a water due to the above mentioned chemical reaction. A purified waste gas removed with $NO_x$ is released to the atmosphere through the exhauster and the like (not shown).

Moreover, the gas reaction apparatus 51 is formed by filling therein a support for supporting a noble metal catalyzer of Pt, Pd and the like, having a catalysis action, or a metal oxide catalyzer of $V_2O_5$, $Mn_2O_3$ and the like, or supporting one and more kinds of catalyzers, thereby the chemical reaction is accelerated. Also, the reaction apparatus 51 is formed by a photocatalyst of titanium oxide and the like having a reduction and cracking reaction function due to an optical energy of an ultraviolet and the like.

Figure 11:
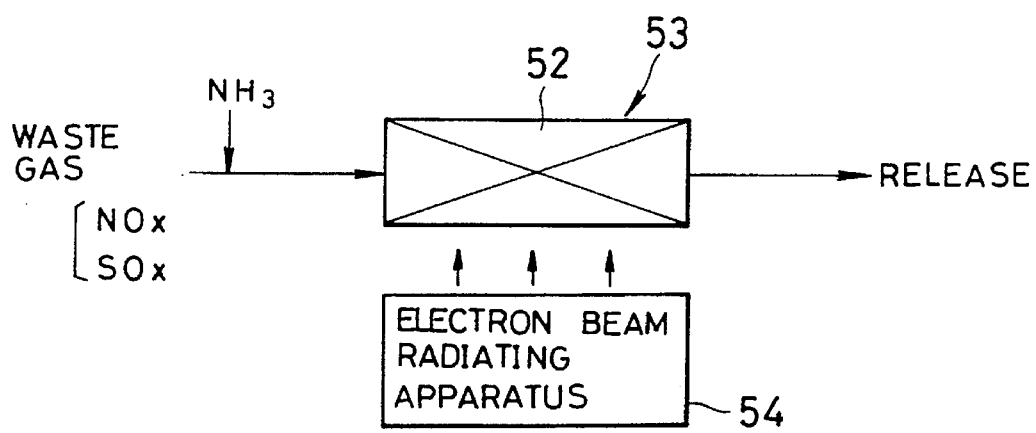
FIG. 11 is a block diagram showing an embodiment of the mixing element according to the present invention applied to an electron beam gas reaction apparatus of a waste gas.

Next, FIG. 11 is a block diagram showing an embodiment of the mixing element according to the present invention applied to an electron beam gas reaction apparatus of a waste gas including $NO_x$ and $SO_x$ discharged from a burning furnace, an incinerator and the like. The waste gas is supplied to an electron beam reaction apparatus 53 together with the $NH_3$ gas as a reducing agent, which apparatus 53 is provided with a static type fluid mixer 50 including the mixing element according to the embodiment of the present invention, and with an electron beam radiating apparatus 54. A gas of $NO_x$ and $SO_x$ in the waste gas is oxidized by the electron beam gas reaction apparatus 53 to become a mist of nitric acid and sulfuric acid, and further it reacts with $NH_3$ to generate micro particles comprised of ammonium sulfate, ammonium nitrate and the mixture thereof. The reaction mechanism is in the following.

1) $N_2, O_2, H_2O + e^- \longrightarrow OH, H, HO_2$

2) $SO_x + (OH, O, HO_2) \longrightarrow H_2SO_4$

3) $NO_x + (OH, O, HO_2) \longrightarrow HNO_3$

4) $H_2SO_4 + 2NH_3 \longrightarrow (NH_4)_2SO_4$

5) $HNO_3 + NH_3 \longrightarrow NH_4NO_3$

Next, a construction of the electron beam gas reaction apparatus 53 will be described. The electron beam gas reaction apparatus 53 is, as shown in FIGS. 1 and 2, provided with the static type liquid mixer 52 including the mixing element 1, 8 constituted by arranging a plurality of the spiral blade bodies of a right-handed twist and a left-handed twist at a predetermined position of the mixing element. Further, the electron beam radiating apparatus 54 is disposed on an inside, an outside or both of them of the electron beam gas reaction apparatus 53. This electron beam gas reaction apparatus 53 is supplied with the waste gas and the $NH_3$ gas. During the waste and the $NH_3$ gas flow in parallel-flow in the electron beam gas reaction apparatus 53, the waste gas and the NH gas are subjected to a mixing-catalysis in gas and liquid in high efficiency while such a division, a joining, a shift and a shearing functions are repeated, and the electron beam is radiated thereon. $NO_x$ and $SO_x$ in the waste gas is oxidized in high efficiency to become a mist of $H_2SO_4$ and $HNO_3$ due to the mixing-catalysis and an electron beam radiation, and further, they react with $NH_3$ to generate micro particles comprised of ammonium sulfate, ammonium nitrate and the mixture thereof. These micro particles are removed by a dust collector and the like (not shown). A purified waste gas is released to the atmosphere through the exhauster and the like (not shown). Incidentally, the electron radiating apparatus 54 may use not only the electron beam but also the ionization radiation and the like of $\alpha$, $\beta$, $\gamma$ rays and X ray and the like.

Figure 12:
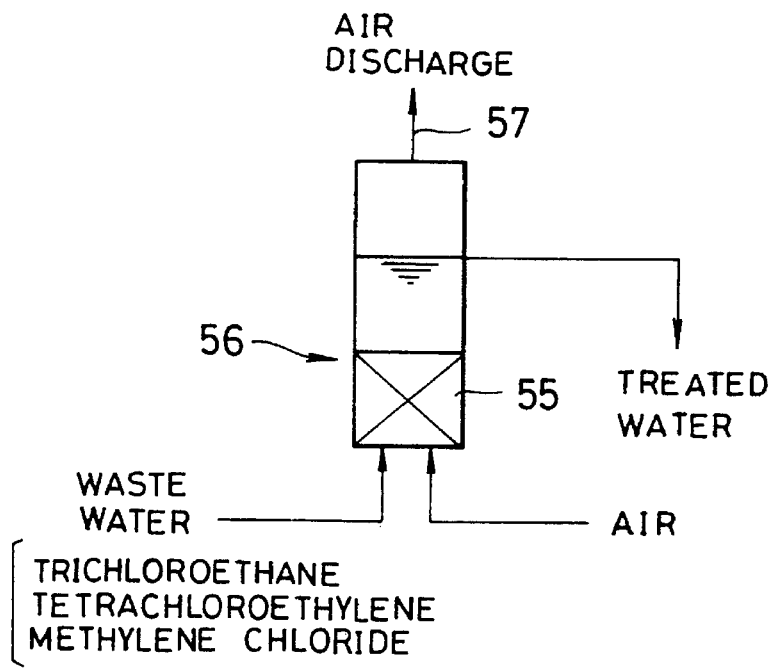
FIG. 12 is a block diagram showing an embodiment of the mixing element according to the present invention applied to a treatment apparatus of a waste water including an organochloric compound.

Next, FIG. 12 is a block diagram showing an embodiment of the mixing element according to the present invention applied to a treatment apparatus of a waste water including an organo-chloric compound which is a volatile substance of trichloroethane, tetrachloroethylene, trichloromethylene, methylene chloride, trihalomethane and the like. The waste water including an organo-chloric compound is supplied together with an air to a waste water treatment apparatus 56 provided with a static type fluid mixer 55 including the mixing element according to the present invention.

Next, a construction of the waste water treatment apparatus 56 will be described. The waste water treatment apparatus 56 is provided with a static type fluid mixer 55 including the mixing element 1, 8 shown in FIGS. 1 and 2. This waste water treatment apparatus 56 is supplied from with the waste water and the air from a lower portion thereof. During the waste water (liquid phase) and the air (gas phase) flow in parallel-flow in the treatment apparatus 56 from the lower portion to the upper portion of the treatment apparatus 56, the waste water and the air are, as described above, subjected to a mixing-catalysis in high efficiency while a right-handed rotation, a left-hand rotation, a division, a joining, a shift and a shearing function are repeated. The organo-chloric compound which is a volatile substance in the waste water is material-transferred to an air (gas phase) and the like due to the contacting-catalysis. The waste water is purified intermittently or continuously while the material transfer operations from the liquid phase to the gas phase are repeated, thereby it is discharged as the treated water. The air including the organo-chloric compound is absorbed and purified by activated carbon and the like, and is released to the atmosphere through a discharging line 57. Also, as occasion demands, the treated water from the treatment apparatus 56 may be subjected to an absorption treatment by activated carbon also to be purified further more. Incidentally, the air and the waste water are supplied to the treatment apparatus 56 by means of a compressor, a fan and the like for the air, and by means of a pump or a difference of static pressures, and the like for the waste water.

The ratio of the amount of the waste water and the amount of the air which are treated in the treatment apparatus 56 can be selected suitably according to the concentration of the organo-chloric compound, the liquid temperature, and the air temperature, however, a range of 1:30 to 1:150 is preferable. Also, a purification efficiency is improved when the waste water and the air are heated by a heater, a steam and the like.

Moreover, in the above mentioned embodiment, the waste water and the air enter into the treatment apparatus 56 from the lower portion of the treatment apparatus 56 and then they may flow therein in parallel-flow. Otherwise, the waste water may be supplied thereto from the upper portion of the treatment apparatus 56 and the air may be supplied thereto from the lower portion of the treatment apparatus 56, and then they may flow in counter-flow to be treated, and the treated water may be discharged from the lower portion. Further, the treatment apparatus 56 may be arranged in a horizontal state, and the waste water and the air may be flown in parallel-flow to be treated. Also, a plurality of the treatment apparatuses 56 may be arranged in series and a fresh air may be supplied into each of the treatment apparatuses 56 to improve the purification efficiency.

Figure 13:
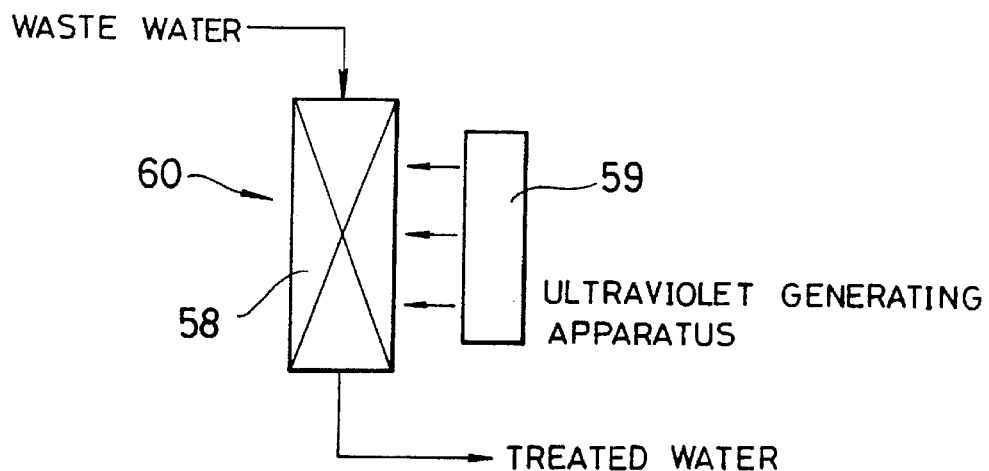
FIG. 13 is a block diagram showing an embodiment of the mixing element according to the present invention applied to a treatment apparatus of a waste water.

FIG. 13 is a block diagram showing an embodiment of the mixing element according to the present invention applied to a treatment apparatus of a waste water including the organo-chloric compound, and a compound of isoxathion, TPN, CAT and the like for use in an insecticide, a bactericide, and a herbicide.

The waste water including the organo-chloric compound and an agricultural chemical and the like is introduced into a waste water treatment apparatus 60 provided with a static type fluid mixer 58 including the mixing element according to the present invention, and an ultraviolet generating apparatus 59. The waste water is, during it flows in the apparatus 60, radiated with an ultraviolet by means of the ultraviolet generating apparatus 59 while it is agitated in high efficiency, and cracked in the following equation to be discharged as the treated water. The treated water is subjected to a neutralization treatment as occasion demands.

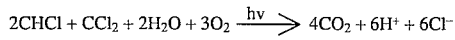
$$2CHCl + CCl_2 + 2H_2O + 3O_2 \xrightarrow{h\nu} 4CO_2 + 6H^+ + 6Cl^-$$

The reaction is accelerated under the existence of $O_3$ and $H_2O_2$ and the like.

Also, the treatment efficiency is improved by forming the mixing element by a perforated body or a three-dimensional mesh-like porous body. Further, the apparatus 60 is applied to an oxidation and cracking process by forming the treatment apparatus 60 by one and more kinds of metals of Fe, Mn, Mg, Zn, Al, Ti and the like. In this case, the ultraviolet apparatus may not be used.

$$3Fe+3H_2O+CHCl:CCl_2 \rightarrow CH_2:CH_2+3Fe^{2+}+3OH^-+3Cl^-$$

This reaction is accelerated under the existence of the $H_2O_2$. The treatment apparatus 60 is formed by a photocatalyst of titanium oxide and the like having an oxidation and cracking reaction function due to an optical energy of an ultraviolet and the like.

Next, a construction of the waste water treatment apparatus 60 will be explained. The waste water treatment apparatus 60 is provided with the static type fluid mixer 58 including the mixing element 1, 8 shown in FIGS. 1 and 2, and the ultraviolet generating apparatus 59. The ultraviolet generating apparatus 59 is disposed on an inner portion, an outer portion and on both of them of the treatment apparatus 60. During the waste water flow in the treatment apparatus 60, the waste water is, as described above, radiated with ultraviolet in high efficiency with an agitation, a right-handed rotation, a left-hand rotation, a division, a joining, a shift and a shearing functions are repeated. Due to the reaction equation, the organo-chloric compound and the agriculture chemical in the waste water is subjected to the oxidation and cracking treatment to be discharged as the treated water. Moreover, the oxidation and cracking treatment efficiency is improved further more by adding $H_2O_2$ or $O_3$ into the waste water.

Figure 14:
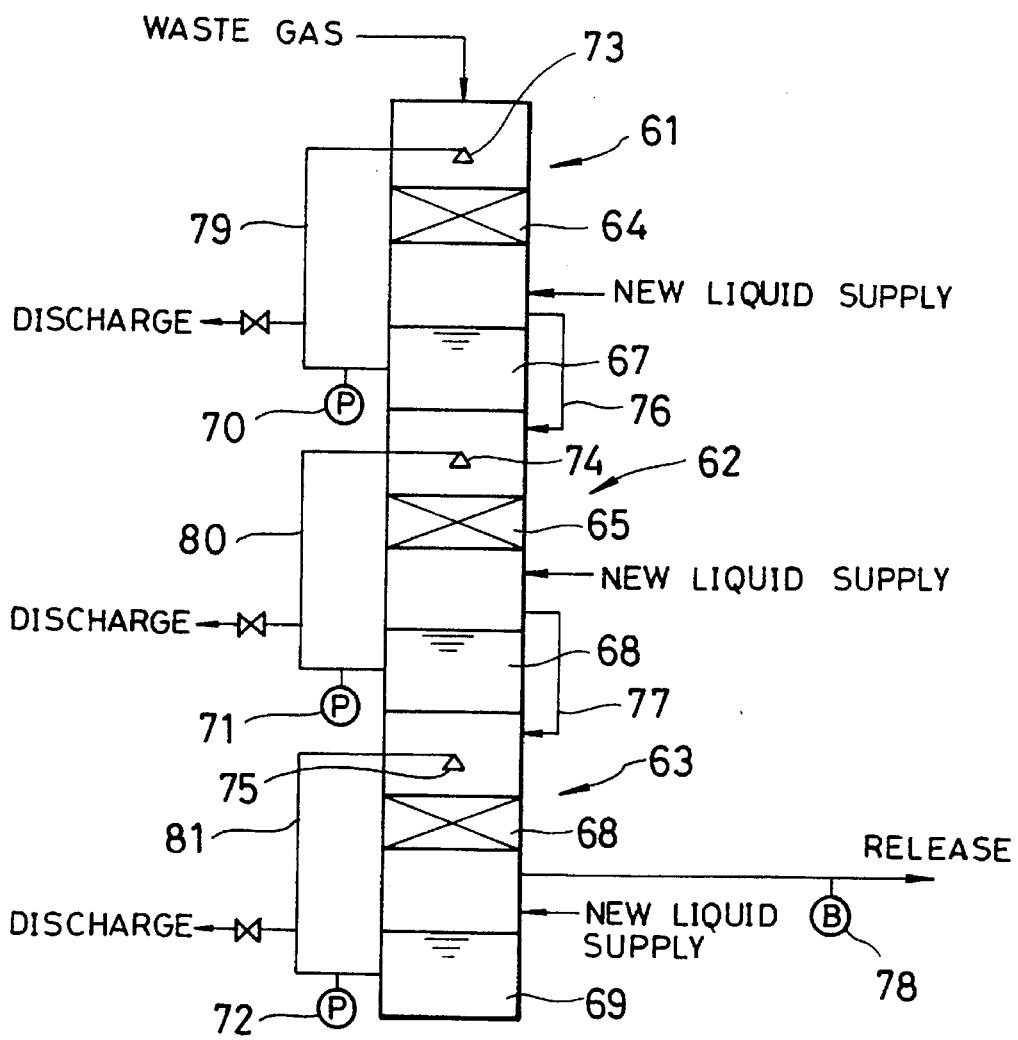
FIG. 14 is a block diagram showing an embodiment of the mixing element according to the present invention applied to a multi-stage type treatment apparatus of a waste water.

FIG. 14 is a block diagram showing an embodiment of the mixing element according to the present invention applied to a multi-stage type treatment apparatus of a waste water including a gas of HCl, $NO_x$ and the like and a dust of $SiO_2$ and the like.

The static type fluid mixers 64, 65, 66 formed by the mixing elements according to the present invention are disposed in a plurality of waste gas treatment apparatuses 61, 62, 63, and tanks 67, 68, 69 are disposed below the treatment apparatuses 61, 62, 63. Also, the tanks 67, 68, 69 are connected with pumps 70, 71, 72, and the liquids in the tanks 67, 68, 69 are injected into the treatment apparatuses 61, 62, 63, respectively.

The waste gas is supplied from the upper portion of the first stage of the treatment apparatus 61 into the treatment apparatus 61. Also, the water solution pumped from the tank 67 by the pump 70 is injected into the treatment apparatus 61 through a spray nozzle 73 disposed an upper portion or an inside of the static type fluid mixer 61. The waste water and the water solution is, during they flow in the treatment apparatus 61 in parallel-flow, subjected to a catalysis in gas and liquid in high efficiency while a right-handed rotation, a left-hand rotation, a division, a joining, a shift and a shearing functions are repeated, as described above. Thereby, a gas of HCl, $NO_x$ and the like and a dust of $SiO_2$ and the like in the waste gas is dissolved, absorbed, caught and collected in the water solution. The waste gas treated in the treatment apparatus 61 is supplied into a second stage of the treatment apparatuses 62 through the waste gas line 76. The supplied waste gas and waster solution are, during they flow in the treatment apparatuses 62, subjected to a mixing-catalysis to be purified further more, as described hereinafter. The purified waste gas is supplied to a third stage of the treatment apparatuses 63 through the waste gas line 76. The supplied waste gas is subjected to a mixing-catalysis to the water solution similarly to the treatment apparatuses 61, 62 to be purified further more. Further, the purified waste gas is released to an outside of the apparatuses 63 through a exhauster 78.

Moreover, the supplied amount of new liquid and the discharged amount of the water solution in the tanks 67, 68, 69 are selected suitably according to the concentration of the substance of HCl, $HNO_3$ and the concentration of solid material of $SiO_2$ and the like. Also, a heat exchanger (not shown) may be disposed on a water solution supplying line to decrease a temperature of the water solution, thereby improving an absorbing efficiency and a collecting efficiency of a gas of $NO_x$ and the like. Further, water solution supplying lines 79, 80, 81 may be connected to each other through pumps and valves (not shown) to move the water solutions which are different in contained substance such as HCl, $HNO_3$, for example, from the low concentration to the high concentration, thereby to use them by stages.

Such a multi-stage type waste water treatment apparatus is applied to the waste water treatment, accordingly, in a case where HCl, $NO_x$ and the like in the waste gas are subjected to a gas absorption by the water solution, as compared with a case of a treatment of a first stage, there can be used by stages the water solution of a high concentration of HCl or HNO₃ for the first stage, the water solution of a middle concentration for the second stage, and the water solution of a low concentration for the third stage. Therefore, HCl, $NO_x$ and the like in the waste gas can be absorbed and collected as hydrochloric acid and nitric acid, so that the absorbing efficiency and the collecting efficiency are improved.

Also, when the dust is caught and collected, there can be used the water solution which is high in solid concentration. The waste water is treated by the water solution which are different in solid concentration of three stages of high, middle and low, so that re-scattering of the dust due to an accompanying of the spray is prevented, then the catching (collecting) efficiency is improved. The filtering treatment at a high concentration is realized, so that the cost of the waste water treatment is decreased. Further, if a plurality of the treatment apparatuses are arranged in the vertical direction, an arrangement area is lessened.

Figure 15:
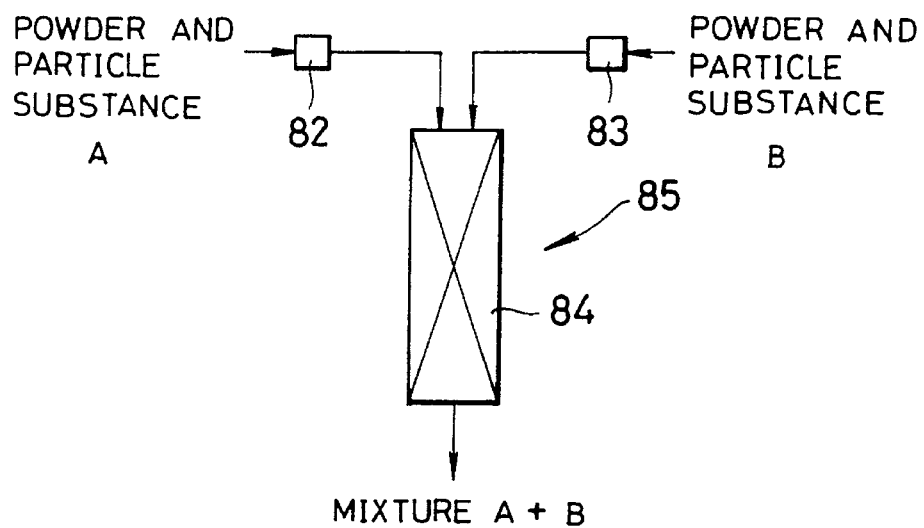
FIG. 15 is a block diagram showing an embodiment of the mixing element according to the present invention applied to a mixing and agitating apparatus for mixing one or more kinds of powder and particle substances.

Next, FIG. 15 is a block diagram showing an embodiment of the mixing element according to the present invention applied to a mixing and agitating apparatus for mixing one or more kinds of powder and particle substance which are different in substance, diameter of particle color and the like.

The powder and particle substances A and B are supplied to a powder and particle substance mixing apparatus 85 in which a static type fluid mixer 84 according to the present invention is arranged through a powder and particle substance supplying apparatus 82, 83 for supplying a predetermined amount of the powder and particle substance. During the powder and particle substance flow in the mixing apparatus 85, they are mixed and agitated by only a flow energy of the powder and particle substance to be discharged as the mixture.

Figure 7:
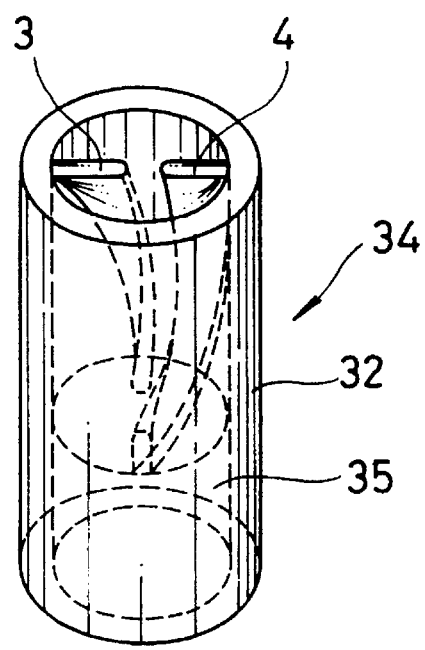
FIG. 7 is a perspective view of a 90° right-handed rotation type mixing element having a space portion according to the same.

Next, a construction of the powder and particle substance mixing apparatus 85 will be explained. The mixing apparatus 85 is provided with a static type fluid mixer 84 including the mixing elements 1, 8 shown in FIGS. 1 and 2. The powder and particle substance is supplied to the mixing apparatus 85 through powder and particle substance measuring and supplying apparatuses 82, 83. The powder and particle substance is, during they flow in the mixing apparatus 85, mixed and agitated continuously and in high efficiency without requiring an agitating power while a right-handed rotation, a left-handed rotation, a division, a joining, a shift, a shearing functions are repeated. Moreover, the mixing element having a space portion shown in FIG. 7 is used to improve the mixing efficiency, thereby a blocking of an inside of the mixing apparatus 85 due to the crosslinking phenomenon of mutual powder and particle substance is prevented. Also, a surface of the mixing element may be subject to an surface treatment such as fluororesin, urethaneresin, rubber and the like, to improve the abrasion resistance and the anti-adhering and the like. Incidentally, the powder and particle substance supplying apparatus is enough to be means for supplying the powder and particle substance continuously at a predetermined amount thereof such as an electro-magnetic feeder, a belt conveyor, a pneumatic transferring pump and the like.

Figure 16:
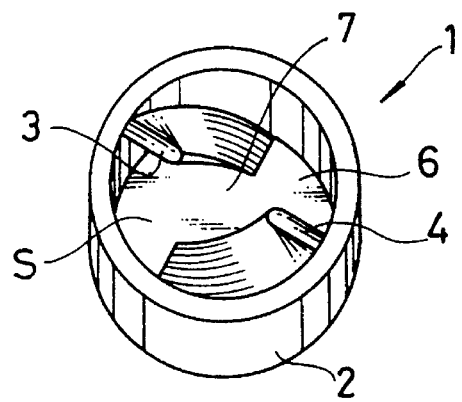
FIG. 16 is an enlarged perspective view of a 90° right-handed rotation type mixing element according to an embodiment of the present invention.
Figure 17:
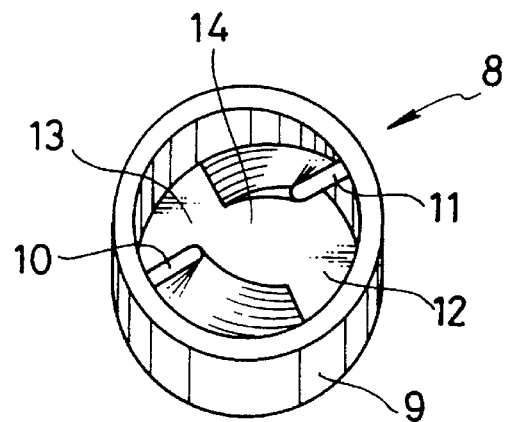
FIG. 17 is an enlarged perspective view of a 90° left-handed rotation type mixing element according to the same.
Figure 18:
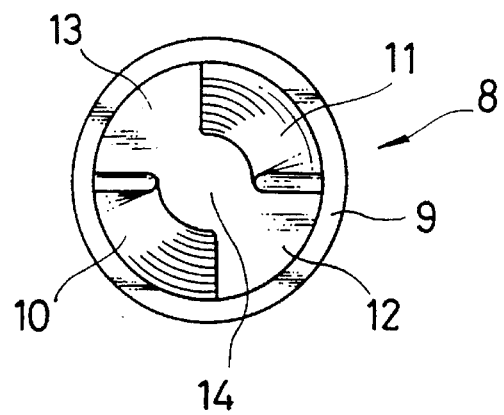
FIG. 18 is a bottom view of a 90° left-handed rotation type mixing element according to the same.
Figure 19:
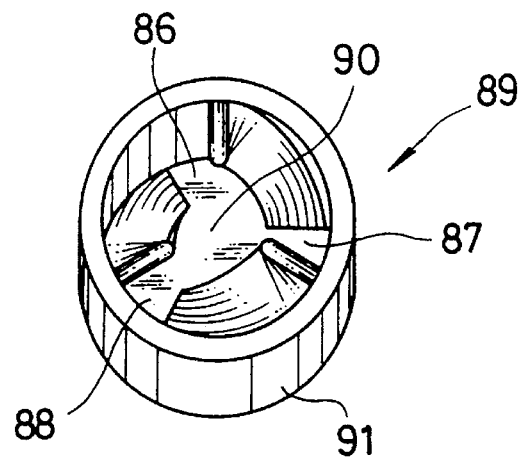
FIG. 19 is a perspective view of a mixing element having three fluid passages according to the present invention.
Figure 20:
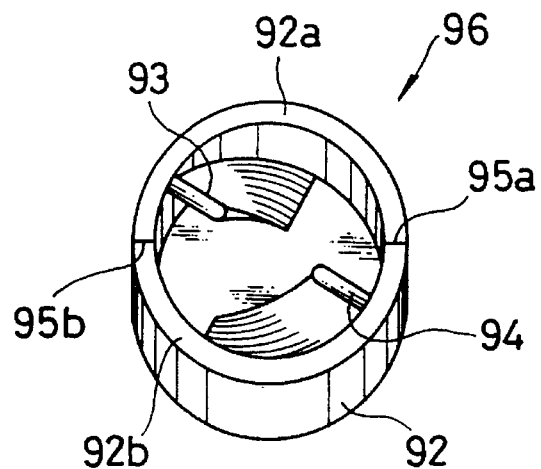
FIG. 20 is a perspective view of a 90° right-handed rotation type mixing element having two divided faces according to the present invention.

Next, one embodiment of a method of producing the mixing element according to the present invention will be described hereinafter with reference to the accompanied drawings. FIG. 16 is an enlarged perspective view of a 90° right-handed rotation type mixing element 1, FIG. 17 is an enlarged perspective view of a 90° left-handed rotation type mixing element 8, FIG. 18 is a bottom view of the mixing element 8, FIG. 19 is a perspective view of a mixing element 89 having three fluid passages 86, 87, 88 and an opening portion 90, and FIG. 20 is a perspective view of a 90° right-handed rotation type mixing element having two divided faces 95a, 95b over the whole longitudinal length of the a cylindrical body 92.

The method of the mixing element 1, 8 is realized by joining spiral blade bodies 3, 4 and 10, 11 to an inside of a cylindrical passage pipe 2 and 9, while the spiral blade bodies 3, 4 and 10, 11 is produced independently to the passage pipe 2 and 9.

Also, the mixing element 96 may be produced by joining a plurality of spiral blade bodies 93, 94 to an inside of cylindrical passage pipes 92a, 92b divided into a plural, while the spiral blade bodies 93, 94 is produced independently to the passage pipe 92a and 92b, and the divided faces 95a, 95b of the divided passage pipes 92a, 92b are joined to each other. Thereby, the mixing element having a number of blade bodies is produced easily.

Figure 21:
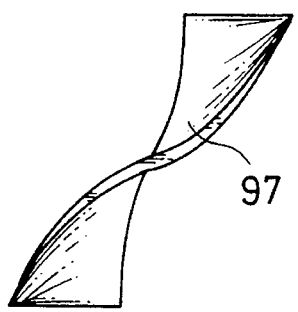
FIG. 21 is a side view of a spiral blade body of a 180° right-handed rotation type produced by a producing method according to the present invention.
Figure 22:
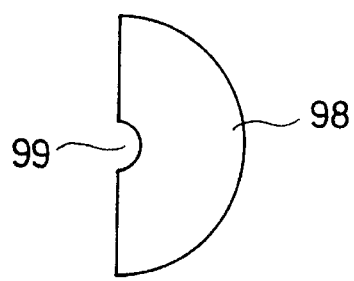
FIG. 22 is a schematic development view of a material of a semi-circle member used in a production of the blade body.
Figure 23:
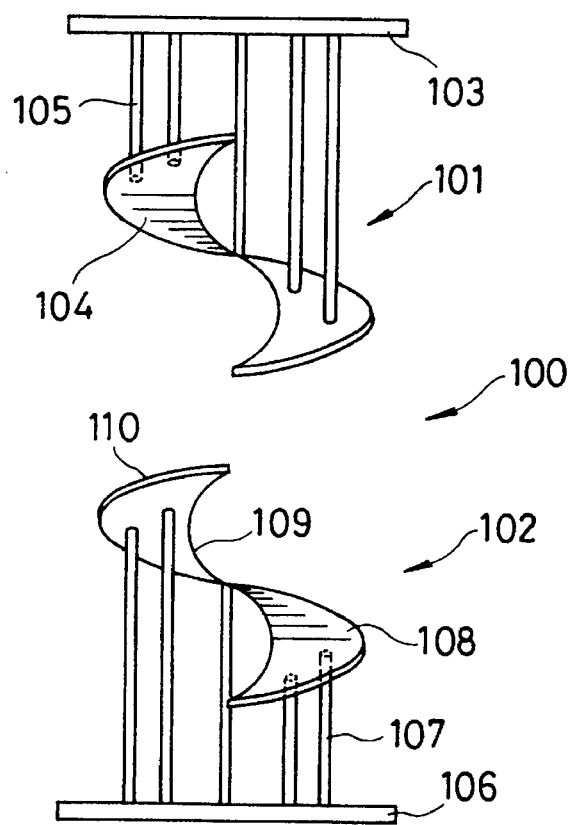
FIG. 23 is a schematic explanatory view of a molding die for producing a blade body according to one embodiment of the present invention.

Next, one embodiment of a method of producing the blade body will be explained with reference to the accompanied drawings. FIG. 21 is a side view of a spiral blade body 97 of a 180° right-handed rotation type for use in the mixing element (Refer to FIG. 4) according to the present invention, FIG. 22 is a schematic development view of a material of a semi-circle member 98 having the same area as the blade body 97, and FIG. 23 is a schematic explanatory view of a molding die 100 for molding the semi-circular member 98.

The molding die 100 has an upper die 101 and a lower die 102. The upper die 101 has a base 103, and a spiral member 104 supported on the base 103 through a plurality of supporting bodies 105. Similarly, the lower die 102 has a base 106, a plurality of supporting bodies 107 and a spiral member 108. Also, the spiral members 104 and 108 have contacting faces forming the spiral face substantially same as the desired blade body, and has a desired width and a predetermined rotation angle (twisting angle). Incidentally, the rotation angle of the spiral member 104 and 108 is 360°.

A semi-circle member 98 is identical in area with the blade body 97, and has a semi-circle hole 99 having a diameter substantially same as a diameter of the opening portion of the mixing element. A spiral blade body 97 of a 180° right-handed rotation type is produced by placing the semi-circle member 98 on a spiral face of the spiral member 108 of a right-handed rotation type on the lower die 102, descending the upper die 101, and interpose-pressing and molding the semi-circle member 98 by the spiral members 104 and 108.

Moreover, in a case where the interpose-pressing and molding is carried out, an inner circumferential edge portion 109 or an outer circumferential edge portion 110 of the spiral member 108 may be provided with protrusions (not shown) to prevent an eccentricity of the semi-circle member 98 at the time of interpose-pressing and molding. Thereby, the exact spiral blade body without eccentricity is produced easily.

Furthermore, the above mentioned embodiment is described with respect to the method of producing the spiral blade body of a 180° right-handed rotation type. However, in case of the spiral blade body of a 180° left-handed rotation type, it is produced similarly to the above mentioned method by using a spiral member of a left-handed rotation type instead of the spiral blade body of a right-handed rotation type if the upper die 101 and the lower die 102. Also, in a case where the blade body of 90° rotation type is produced, the spiral body of a 180° rotation type may be cut into two bodies at a position of 90° rotation angle thereof to form a blade body of 90° rotation type. Or, the blade body of 90° rotation type may be produced similarly to the method mentioned above by interpose-pressing and molding a plate like member developed in a plane similarly to the semicircular member 98. Further, in case of the spiral blade body of a 360° rotation type, it is produced by the similar method mentioned above.

Also, a perforated blade body is produced by forming a plate having a plurality of circle like holes or slit perforated in a thicknesswise direction of the plate in a spiral. And, in a case where the porous blade body is produced, it is enough to be formed by using a support in which a metal or a ceramic and the like is coated on urethane form of three dimensional mesh like construction or three dimensional mesh like molding body of urethane form and the like, or a material in which the support is sintered, and the like.

Further, the method of the blade body disposed in the mixing element according to the present invention is not limited to the above mentioned embodiments, for which other methods can be selected suitably according to a construction material. That is, the other methods are an injection molding method, an extrusion molding, a press molding method, a casting method, a forging method, a lost wax method, a spinning-winding working method, a mud cast-in method and the like. Incidentally, as the construction material, there can be selected to be used suitably one kind of a metal, a plastic, a ceramic, a glass and the like, or a composite material thereof, according to the use. Also, the producing method and the construction material are selected to be used suitably for the passage pipe similarly to the blade body.

Figure 24:
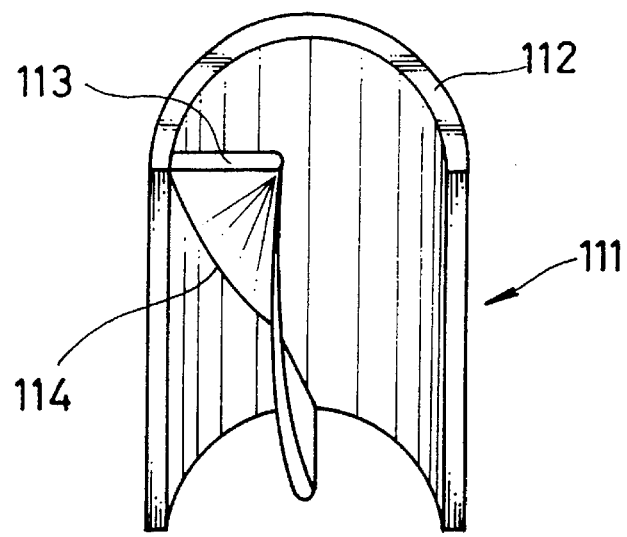
FIG. 24 is a partially enlarged explanatory view of a producing processes of a 90° right-handed rotation type mixing element according to the present invention.

Next, FIG. 24 is a partially enlarged explanatory view of a producing processes of a 90° right-handed rotation type mixing element. There will be explained in detail with reference to FIG. 24 a method of producing the mixing element according to the present invention comprising a step of joining a cylindrical passage pipe having a desired diameter and a desired length and a blade body produced independently to the passage pipe.

Similarly to the mixing element (Refer to FIG. 1) mentioned above, the mixing element 111 has a spiral blade body 113 of a 90° right-handed rotation type inside a cylindrical passage pipe 112. The blade body 113 is joined to the passage pipe 112 at a joining portion 114 by means of a welding, an adhering, a depositing, or a locking and the like. The mixing element 111 is produced by joining a desired number of the blade bodies 113 on an inside of the passage pipe 112 at a predetermined positions in order according to the similar joining method mentioned above.

Figure 25:
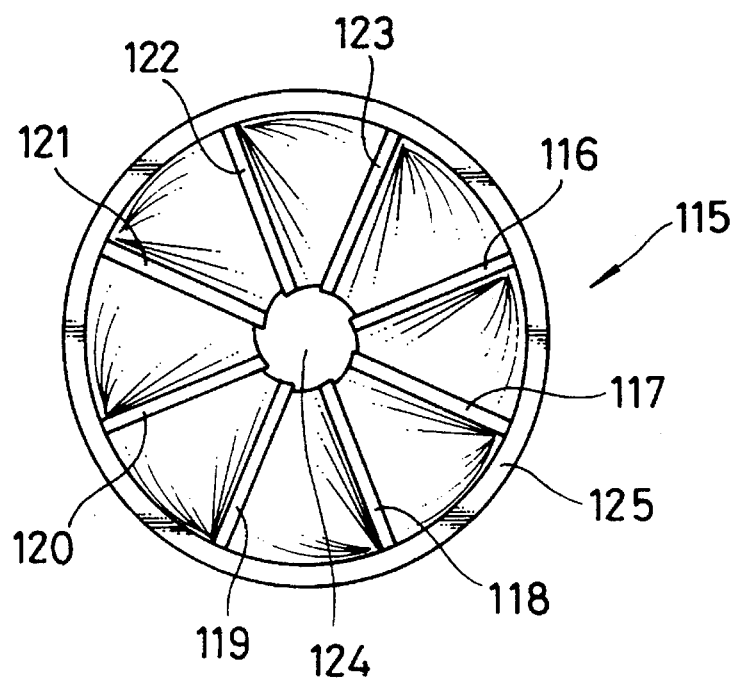
FIG. 25 is a plan view of a right-handed rotation type mixing element having eight blade bodies according to the present invention.

The mixing element is produced easily according to the producing method mentioned above. Also, the mixing element having a large diameter can be produced easily and at a low cost. Further, there can be produced easily the mixing element provided with a plurality of the blade bodies contributing an improvement of the mixing efficiency inside of the cylindrical passage pipe (Refer to FIG. 25). In this case, the mixing element 115 can be produced easily and at a low cost further more by using a plurality of the divided passage pipe over the whole longitudinal length of the passage pipe.

Figure 26:
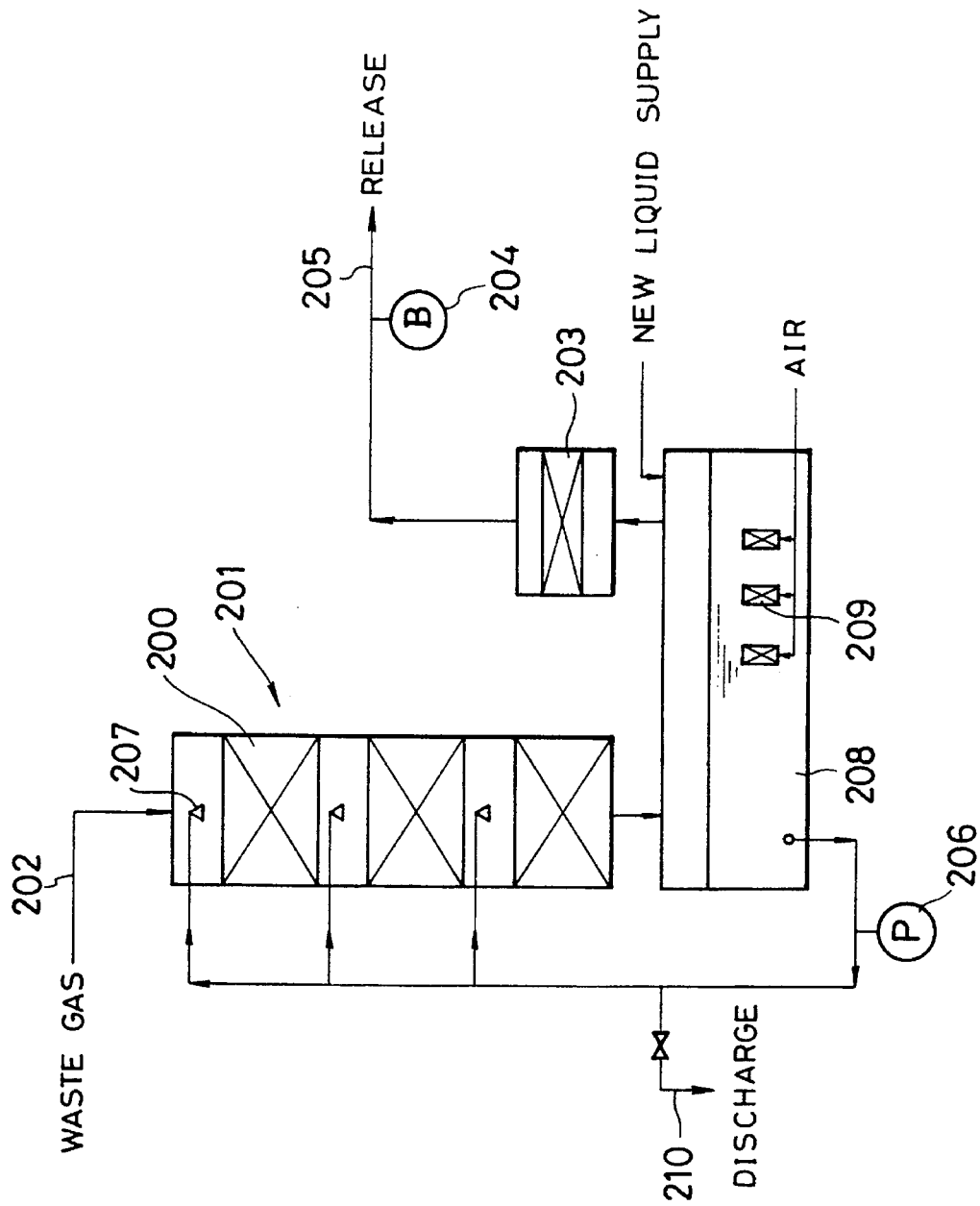
FIG. 26 is an explanatory view of an embodiment of the mixing element according to the present invention applied to a wet type exhaust gas desulfurizer.

Next, FIG. 26 is an explanatory view of an embodiment of the mixing element according to the present invention applied to a wet type exhaust gas desulfurizer. The waste gas including sulfur oxides, especially sulfur dioxides ($SO_2$) exhausted from a boiler (not shown) is introduced to a desulfurizing tower main body 201 from an inlet duct 202, and exhausted from an outlet duct 205 through a mist separator 203 and an exhauster 204. An absorbing liquid including calcium carbonate transferred from an absorbing liquid pump 206 is sprayed through a plurality of spray nozzles 207 into the desulfurizing tower (absorbing tower) 201 provided therein with a mixing element 200 according to the present invention, and then a gas-liquid mixing-catalysis between the absorbing liquid and the waste gas is performed. At this occasion, the absorbing liquid absorbs $SO_2$ in the waste gas selectively thereby calcium sulfite is produced according to the following reaction equation.

$$SO_2 + H_2O = H^+ + HSO_3^- \tag{1}$$

$$HSO_3^- = H^+ + SO_3^- \tag{2}$$

$$CaCO_3 = Ca^{++} + CO_3 \tag{3}$$

$$Ca^{++} + SO_3^- = CaSO_3 \tag{4}$$

$$CaSO_3 + \tfrac{1}{2}H_2O = CaSO_3 \cdot (\tfrac{1}{2})H_2O \tag{5}$$

The absorbing liquid producing calcium sulfite is collected in an oxidation tank 208, and then is agitated by a static type mixer 209, during which calcium sulfite in the absorbing liquid is oxidized by an air supplied from an air blowing apparatus (not shown), thereby plaster is produced.

The reaction in the oxidation tank 208 is in the following.

$$HSO_3^- + \tfrac{1}{2}O_2 \rightarrow SO_4^- + H^+ \tag{6}$$

$$Ca^{++} + SO_4^- \rightarrow CaSO_4 \tag{7}$$

$$CaSO_3 + 2H_2O \rightarrow CaSO_4 \cdot 2H_2O \tag{8}$$

One portion of the absorbing liquid in the oxidation tank 208 in which calcium carbonate and plaster coexist is transferred to the spray nozzles 207 again through the absorbing liquid pump 206, and the other portion is transferred to a waste liquid treating and plaster collecting system (not shown) through an absorbing liquid extracting pipe 210. Also, one portion of the absorbing liquid sprayed and atomized from the spray nozzles 207 is accompanied with the waste gas, however, it is collected by the mist separator 203 connected to the oxidation tank 208.

The higher the PH is, the more an absorption rate of $SO_2$ is improved. However, absorbing liquid drops sprayed from the spray nozzles 207 are rapid in diffusion therein, so that PH of a surface of the liquid drop is decreased when calcium sulfite is produced on the surface of the liquid drop due to the reaction to $SO_2$. Therefore, the reactivity to $SO_2$ in the absorbing drop is lowered abruptly. In the end, the absorbing liquid reacts with $SO_2$ immediately when it is sprayed, however, goes down to the oxidation tank 208 almost without absorbing $SO_2$ when PH of the surface of the liquid drop is decreased once.

Accordingly, the absorbing liquid drops turn out to have an absorbing efficiency if PH can be recovered before the absorbing liquid drops reaches to the oxidation tank 208, so that the reaction to $SO_2$ is accelerated to improve the absorption rate.

As a method of recovering PH of the absorbing liquid drops which has been decreased once, there is a method of oxidizing calcium sulfite exist on the surface of the absorbing liquid drops.

Figure 27:
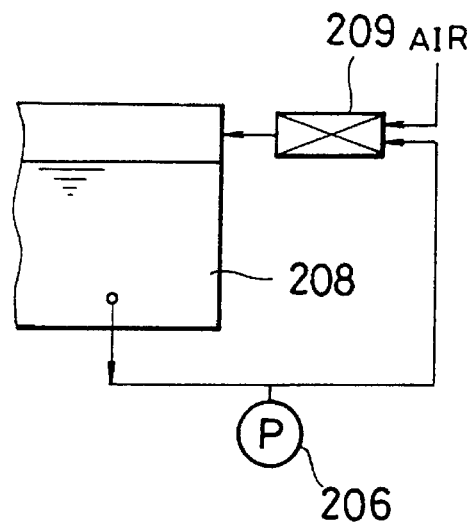
FIG. 27 is an explanatory view showing an variant embodiment of the oxidation tank for oxidizing the absorbing liquid and calcium sulfite.

FIG. 27 is an explanatory view showing an variant embodiment of the oxidation tank 208 for oxidizing the absorbing liquid and calcium sulfite. The absorbing liquid is transferred to the mixer 209 by the pump 206, and the absorbing liquid and the air are mixed in the mixer 209 to be returned to the oxidation tank 208.

Moreover, two of the requirements for the construction of the desulfurizing tower (absorbing tower) are in the following.

1) Since a liquid-gas ratio and a gas-liquid contacting efficiency are varied if a drift current of the waste gas in the desulfurizing tower is generated, a bad influence is exerted to the desulfurizing performance.
2) To prevent an adhering of a crystal product such as calcium sulfite, calcium sulfate and the like.

In a case where the static type mixer according to the present invention is used for the absorbing tower of the wet type exhaust gas desulfurizer, a dissolving of $SO_2$ and an oxidation reaction of the reaction product (reaction intermediate) are accelerated, further a gas-liquid interface of the absorbing liquid and the gas, and surfaces of the absorbing liquid drops are renewed to contribute an acceleration of a gas absorbing reaction. Also, a slurry liquid (absorbing liquid) is circulated to be used always in an agitating state. Furthermore, the spray nozzles provided in the absorbing tower prevents an adhering and a growth of the reaction product and the slurry and the like to the blade body, and increases the gas-liquid contacting to improve the absorbing efficiency, and further, contributes a lowering of the pressure loss in the tower. Further, the spray nozzle has a function of supplying the new fresh absorption liquid.

Incidentally, as the absorbing liquid, there can be used one and more kinds of soda compounds, magnesium compounds, calcium compounds, ammonia compounds, aluminum compounds, organic bases (example: aromatic amines), aqueous acids and molten salts.

Figure 28:
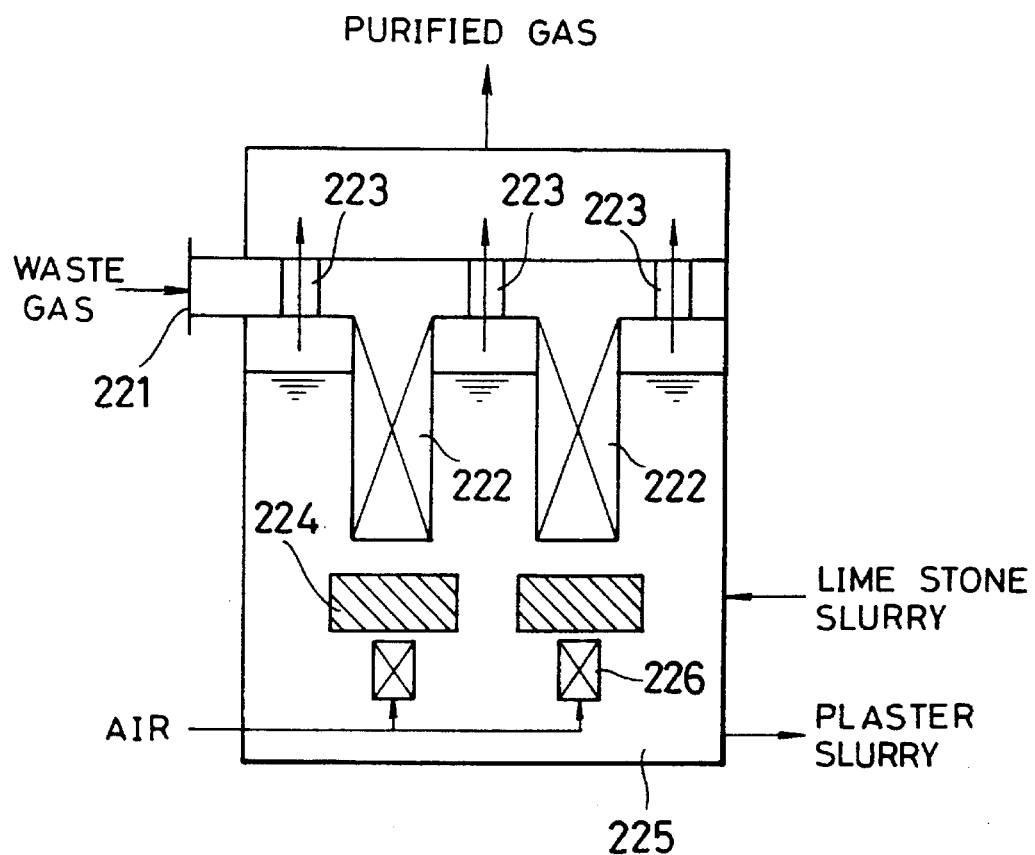
FIG. 28 is an explanatory view showing an embodiment of the mixing element according to the present invention applied to the wet type exhaust gas desulfurizer.

Next, an embodiment in which the mixing element according to the present invention is applied to the wet type exhaust gas desulfurizer with reference to FIG. 28.

The waste gas is blown into the liquid below the surface thereof by 50–500 mm through an inlet plenum 221 and one or more static type fluid mixers 222 extending to under the liquid surface therefrom. A high efficient gas-liquid mixing-catalysis is made in the static type fluid mixer 222, thereby $SO_2$ is absorbed. The desulfurized and purified gas is exhausted to an outside through the gas exhaust pipe 223.

$SO_2$ absorbed in the mixer 222 is oxidized into sulphate ion immediately thereat. The absorbing liquid is moved to a lower portion of the apparatus after bubbles are removed, into which lime stone slurry is poured in order to supply calcium ion. Then, the absorbing liquid is moved to oxygen dissolving regions 224. On this region, the absorbing liquid dissolving oxygen is moved to a mixer layer to act as a medium of absorbing and oxidizing $SO_2$ again. The produced crystal of plaster exists in the absorbing liquid in a suspended state, and is discharged to an outside of the bath as one of the absorbing liquid is drawn from the lower portion of the bath 225, and then it is subjected to a solid-liquid separation. Static type fluid mixer 226 are arranged blow the oxygen dissolving regions 224. An oxygenation is accelerated by flowing the absorbing liquid and the air in the mixers 226.

Thus, since respective operation of absorbing, oxidization, and crystallization can be realized in one bath, the apparatus becomes compact, and any absorbing liquid pump is not required. Also, the desulfurization is realized efficiently.

Figure 29:
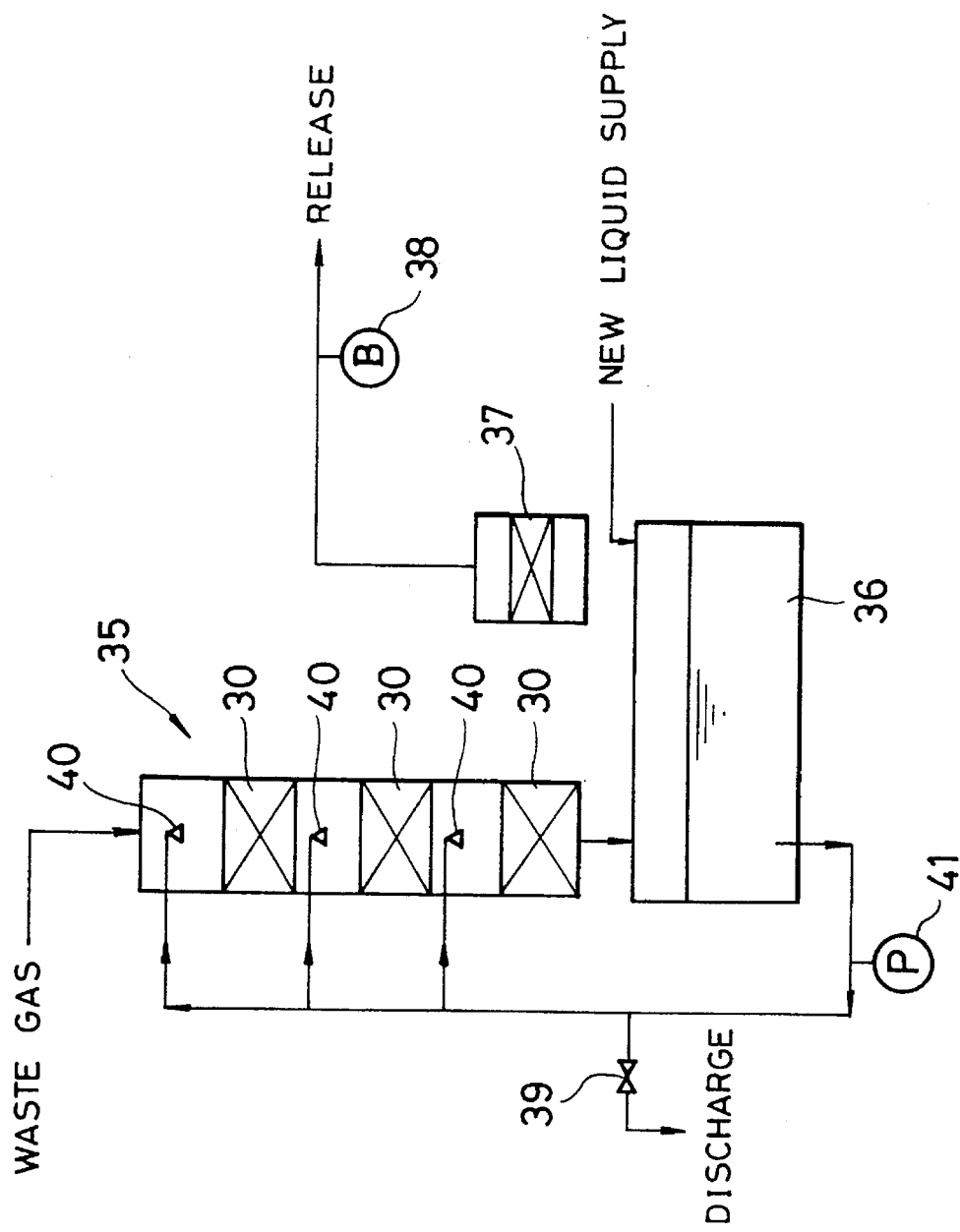
FIG. 29 is an explanatory view showing a variant embodiment of the apparatus in FIG. 8.

FIG. 29 is an explanatory view showing a variant embodiment of the apparatus in FIG. 8. In the treatment apparatus 35 of the embodiment, three pairs of the nozzles 40 and the static type fluid mixers 30 are arranged vertically and connected to each other. That is, the spray nozzle 40 is arranged between the static type fluid mixers 30.

Figure 30:
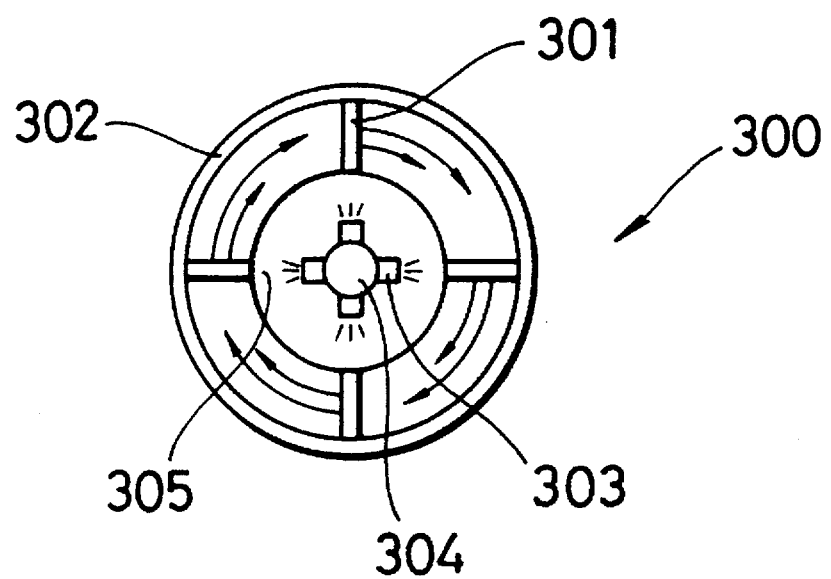
FIG. 30 is an explanatory view showing an embodiment in which spray nozzles are arranged in a center portion of the static type fluid mixer.

FIG. 30 is an explanatory view showing an embodiment in which spray nozzles are arranged in a center portion of the static type fluid mixer. Two pairs of blade bodies 301 are arranged inside of a mixing element 302 of a static type fluid mixer 300, and spray nozzles 303 are arranged on an opening portion 305 at a center portion of the mixing element 302. The nozzle 303 is connected to a water passing pipe 304 extending in parallel with a center axis of the mixing element 302, and a water supplied from the water passing pipe 304 is injected into the mixing element 302 through the nozzle 303.

Figure 31:
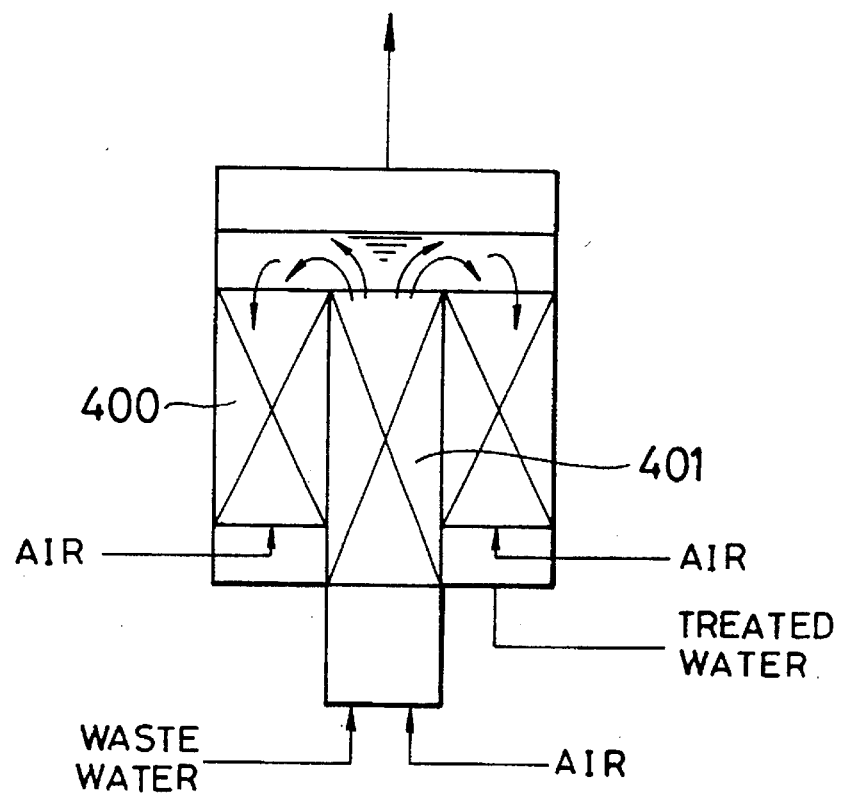
FIG. 31 is an front view showing an embodiment of the mixing element according to the present invention is applied to a treatment apparatus of a waste water including an organo-chloric compound.
Figure 32:
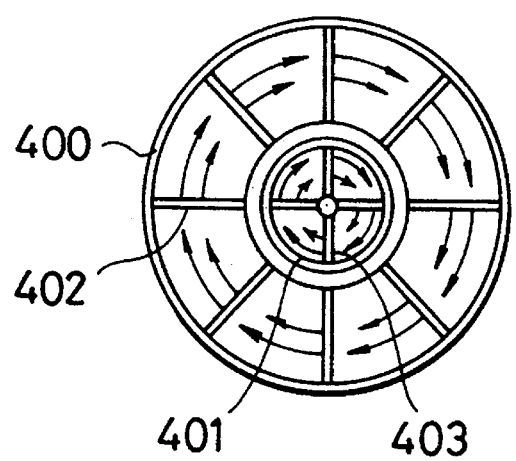
FIG. 32 is a plan view of the apparatus in FIG. 31.

FIG. 31 is a front view showing an embodiment of the mixing element according to the present invention applied to a treatment apparatus of a waste water including an organo-chloric compound. FIG. 32 is a plan view of the apparatus in FIG. 31. A central fluid mixer 401 has two pairs of blade bodies 403, and a ring-like fluid mixer 400 receives the fluid mixer 401 with the fluid mixer 401 as a center. Four pairs of blades 402 are disposed on a ring-like passage of the fluid mixer 400. And, the center fluid mixer 401 is introduced with the waste water and the air from a lower portion thereof, and the treated water discharged from an upper portion of the fluid mixer 401 enters into the outer fluid mixer 400 and goes down therethrough. The entrained air is discharged from the upper portion of the mixer 400. The outer fluid mixer 400 is supplied with the air from a lower end thereof, and the treated water going down from above and the air is mixed therein.

Figure 33:
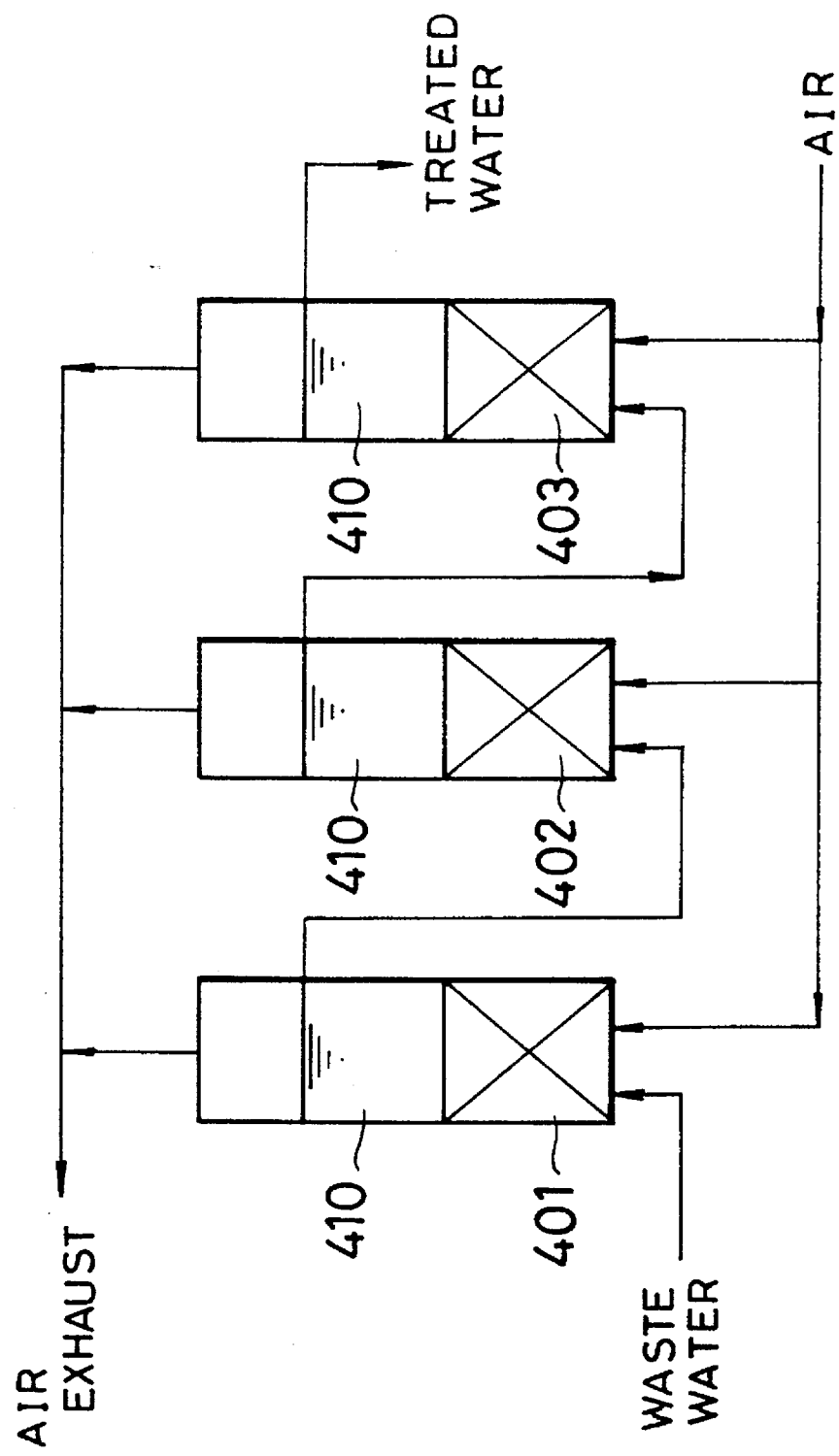
FIG. 33 is an explanatory view of another embodiment of the mixing element according to the present invention applied to a treatment apparatus of a waste water including an organo-chloric compound.

FIG. 33 is an explanatory view of another embodiment in which the mixing element according to the present invention is applied to a treatment apparatus of a waste water including an organo-chloric compound. Static fluid mixers 401, 402, 403 are arranged parallel, and a compressed air is supplied into the mixers from lower portions of respective fluid mixers, and then the air is discharged outside from upper portions of the mixers. And, the waste water to be treated enters into a first fluid mixer 401 from a lower portion thereof, then is collected at an upper portion thereof once. This treated water 410 overflows from the first fluid mixer 401, then enters into a second fluid mixer 402 from a lower portion thereof. And, this treated water 410 rises in the fluid mixer 402, and overflows from an upper portion thereof, then enters into a third fluid mixer 403. Finally, the treated water 410 is discharged from an upper portion of the third fluid mixer 403 to finish the treatment.

Figure 34:
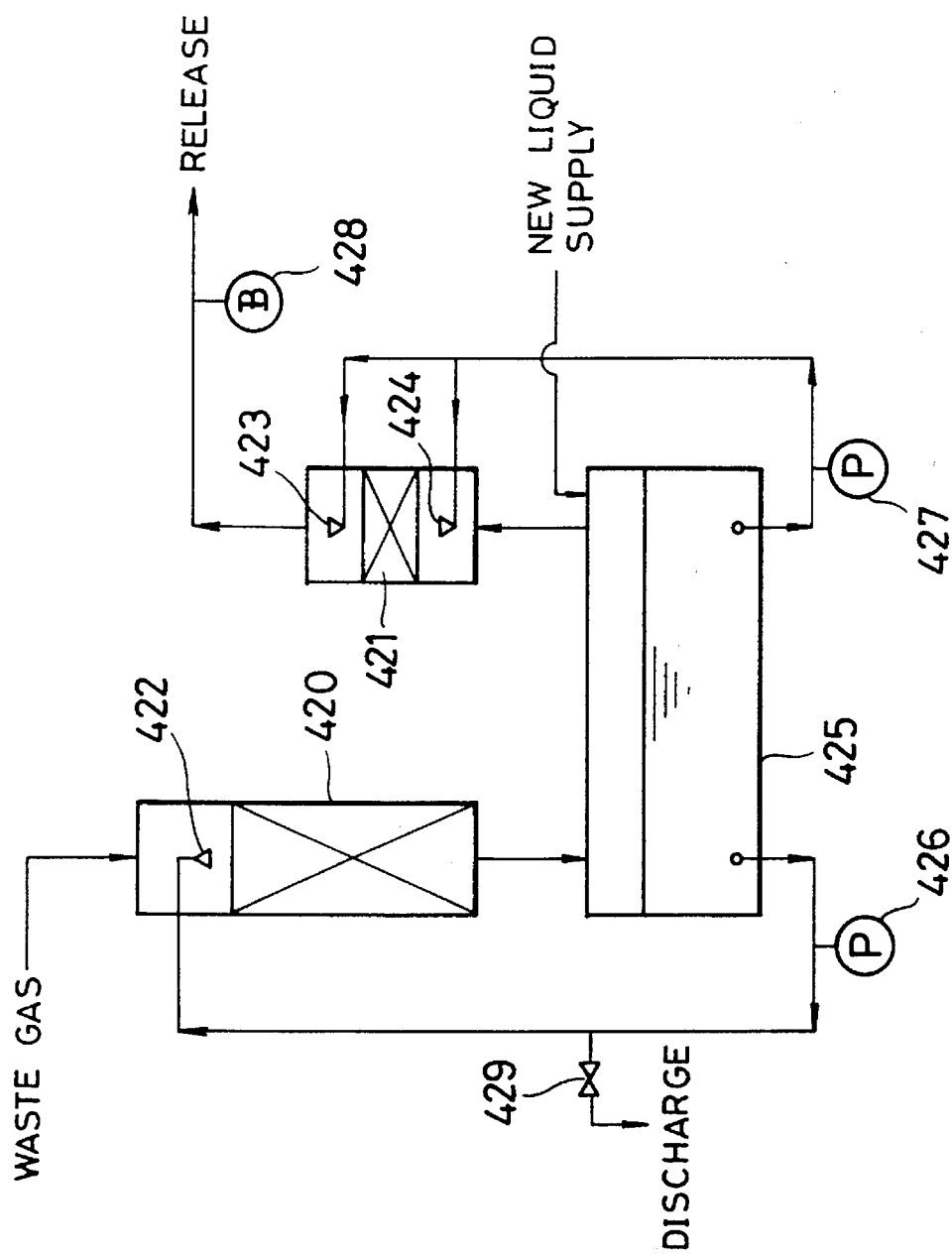
FIG. 34 is an explanatory view of a treating method by two treating towers.

FIG. 34 is an explanatory view of a treating method by two treating towers. A spray nozzle 422 is disposed at an upper portion of a fluid mixer 420 of a first treatment tower. The waste gas is supplied into the mixer 420 from above, and the waste gas is treated by the absorbing liquid injected downward from the nozzle 422. This absorbing liquid is a circulation liquid collected in the bath 425, and this circulation liquid is pumped to the spray nozzle 422 by the pump 426. This circulation liquid is discharged through a valve 429 as occasion demands. The treated liquid after a treatment at the fluid mixer 420 of the first treatment tower goes down in the bath 425, the treated gas is supplied to a fluid mixer 421 of a second treatment tower from a lower portion thereof. Spray nozzles 423, 424 are arranged in the fluid mixer 421 of the second treatment tower at an upper portion thereof and a lower portion thereof so as to orient at jetting directions upward. And, a circulation liquid in the bath 425 is fed to the stray nozzles 423, 424 by the pump 427, and injected from the nozzles 423, 424. In the fluid mixer 421, the treated gas supplied from the bath 425 is further treated at the fluid mixer 425 by the absorbing liquid injected from the nozzles 423, 424, and discharged to an upper portion of the mixer 421. The absorbing liquid goes down in the mixer 421 to return to the bath 425. The treated by the fluid mixer 42 is sucked by an exhauster 428 to be exhausted. The treated gas is treated by a parallel-flow with the absorbing liquid in the mixer 420 of the first treatment towers. The treated gas is treated by a counter-flow to the absorbing liquid in the mixer 421 of the second treatment tower.

What is claimed is:

1. A mixing element comprising:

a cylindrical passage pipe through which a liquid flows; and a plurality of blade bodies disposed inside the passage pipe, the blade bodies forming inside the passage pipe a plurality of fluid passages extending spirally and in a longitudinal direction of the passage pipe, and a gap between the blade bodies forming an opening for communicating the fluid passages to each other, wherein said blade bodies are selected from the group consisting of perforated bodies and porous bodies.

2. A mixing element according to claim 1, wherein the blade body is twisted spirally in a clockwise direction.

3. A mixing element according to claim 1, wherein the blade body is twisted spirally in an anti-clockwise direction.

* * * * *